(12) United States Patent
Umemoto et al.

(10) Patent No.: US 8,437,117 B2
(45) Date of Patent: May 7, 2013

(54) SOLID ELECTROLYTIC CAPACITOR WITH IMPROVED STRESS RESISTANCE IN THE VICINITY OF THE ANODE LEAD AND THE ANODE TERMINAL

(75) Inventors: Takashi Umemoto, Hirakata (JP); Nobuhiko Hayashi, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 330 days.

(21) Appl. No.: 12/720,876

(22) Filed: Mar. 10, 2010

(65) Prior Publication Data

US 2010/0246100 A1 Sep. 30, 2010

(30) Foreign Application Priority Data

Mar. 31, 2009 (JP) ................. 2009-084892

(51) Int. Cl.
*H01G 2/10* (2006.01)
*H01G 9/08* (2006.01)
*H01G 9/04* (2006.01)
*H01G 9/145* (2006.01)

(52) U.S. Cl.
USPC .......................... 361/535; 361/528

(58) Field of Classification Search ............ 361/535, 361/536, 539, 523, 528
See application file for complete search history.

(56) References Cited

U.S. PATENT DOCUMENTS

| | | | | |
|---|---|---|---|---|
| 4,001,655 A | * | 1/1977 | Voyles et al. | 361/534 |
| 5,469,326 A | * | 11/1995 | Kanetake | 361/534 |
| 6,229,688 B1 | * | 5/2001 | Kobayashi et al. | 361/523 |
| 6,845,004 B2 | * | 1/2005 | Melody et al. | 361/538 |
| 7,292,432 B2 | * | 11/2007 | Furuzawa et al. | 361/523 |
| 2009/0135550 A1 | * | 5/2009 | Umemoto et al. | 361/523 |
| 2009/0213530 A1 | * | 8/2009 | Nemoto et al. | 361/523 |
| 2010/0079930 A1 | * | 4/2010 | Hayashi et al. | 361/534 |

FOREIGN PATENT DOCUMENTS

| | | | |
|---|---|---|---|
| JP | 63-211615 A | | 9/1988 |
| JP | 03040413 A | * | 2/1991 |
| JP | 03292716 A | * | 12/1991 |
| JP | 04216608 A | * | 8/1992 |
| JP | 08-148392 A | | 6/1996 |
| JP | 2000208367 A | * | 7/2000 |
| JP | 2001-203128 A | | 7/2001 |

* cited by examiner

*Primary Examiner* — David M Sinclair
(74) *Attorney, Agent, or Firm* — Marvin A. Motsenbocker; Mots Law, PLLC

(57) ABSTRACT

A solid electrolytic capacitor includes at least one capacitor element in which the other end of an anode lead extends beyond an exposed portion of an electrolyte layer exposed from a cathode layer. The solid electrolytic capacitor further includes: an anode terminal connected to the other end of the anode lead, a cathode terminal connected to the cathode layer, a resin layer and a resin outer package covering the capacitor element and the resin layer. The resin layer covering the exposed portion of the electrolyte layer, the other end of the anode lead, and a connecting part between the other end of the anode lead and the anode terminal. The resin layer includes a first resin layer covering the exposed portion and a second resin layer covering the first resin layer, the first resin layer being softer than the second resin layer.

7 Claims, 14 Drawing Sheets

(a)

(b)

(c)

PRIOR ART

SOLID ELECTROLYTIC CAPACITOR WITH IMPROVED STRESS RESISTANCE IN THE VICINITY OF THE ANODE LEAD AND THE ANODE TERMINAL

BACKGROUND OF THE INVENTION

1. Field of the Invention

This invention relates to solid electrolytic capacitors having a resin outer package.

2. Description of Related Art

FIG. 17 shows in cross section the structure of a conventional solid electrolytic capacitor.

As shown in the figure, a conventional solid electrolytic capacitor 120 has a capacitor element 106 that includes: an anode 101 made of a valve metal; an anode lead 102 provided in the anode 101 and having one end 102a embedded in the anode 101 and the other end 102b extending from the anode 101; a dielectric layer 103 formed by anodizing the anode 101; an electrolyte layer 104 formed on the dielectric layer 103; and a cathode layer 105 formed on the electrolyte layer 104. The anode 101 and the anode lead 102 are joined and integrated together by embedding the anode lead 102 into a powdered mass of a valve metal to extend the other end 102b of the anode lead from the powdered mass, pressing the powdered mass into the shape of an anode 101 and sintering it.

Furthermore, an anode terminal 107 is attached to the other end 102b of the anode lead 102, and a cathode terminal 109 is attached to a surface of the cathode layer 105 with a conductive adhesive 108. The solid electrolytic capacitor 120 is formed through a molding process including: setting of the capacitor element 106 in a mold for resin molding with the anode terminal 107 and cathode terminal 109 fixed; and encapsulation with a resin outer package 111. In this molding process, a resin for forming the resin outer package 111 is poured into the mold for resin molding.

In such a solid electrolytic capacitor 120, the anode 101 and the anode lead 102 are joined and integrated together. In joining the anode 101 and the anode lead 102, defects and strains are likely to be produced particularly in the anode 101. The dielectric layer 103 is a self-oxidation film formed by anodizing the anode 101. Therefore, if anodization is done with defects or strains produced in the anode 101 as above, defects or strains are also likely to be produced in a part of the dielectric layer 103 located in the vicinity of the region in which the anode 101 and the anode lead 102 are joined together. In addition, the part of the dielectric layer 103 in the vicinity of to the region in which the anode 101 and the anode lead 102 are joined together is susceptible to stress transmitted from the anode lead 102 in the molding process, whereby the dielectric layer 103 is likely to produce defects, such as cracks.

A technique for coping with the above problem is disclosed in Published Japanese Patent Application No. 2001-203128, in which a root 102c of the anode lead 102, which is a part at which the other end 102b of the anode lead extends from the anode, is covered with a thermosetting resin to hold the anode lead rigidly. According to this technique, stress applied from the anode lead to the dielectric layer in the molding process can be reduced. Therefore, in the solid electrolytic capacitor disclosed in the above document, the occurrence of cracks in the dielectric layer can be reduced and the leakage current can thereby be reduced.

SUMMARY OF THE INVENTION

The method disclosed in Published Japanese Patent Application No. 2001-203128 can reduce to a certain extent the stress transmitted from the anode lead to the dielectric layer in the molding process by holding the anode lead rigidly as described above. In the method disclosed in the above document, on the other hand, in pouring a resin for forming the resin outer package into the mold for resin molding in the molding process, the resin is brought into direct contact with a part of the anode lead not covered with the thermosetting resin. This results in insufficient reduction of stress transmitted from the anode lead to the dielectric layer. Furthermore, the other end of the anode lead and the anode terminal are mechanically fixed to each other only at the connecting part between them. Therefore, stress due to a pouring pressure in pouring the resin for forming the resin outer package is transmitted to the anode terminal, and in turn transmitted to the anode lead. If in such a case only the root of the anode lead is rigidly held by a thermosetting resin, the stress applied from the anode terminal through the anode lead to the dielectric layer cannot sufficiently be reduced. Accordingly, the method described in the above document cannot sufficiently suppress the occurrence of cracks in a part of the dielectric layer located in the vicinity of the region in which the anode and the anode lead are joined together, and cannot thereby sufficiently reduce the leakage current.

With the foregoing in mind, an object of the present invention is to provide a solid electrolytic capacitor capable of reducing the leakage current.

The present invention is directed to a solid electrolytic capacitor including at least one capacitor element that includes an anode, a dielectric layer covering the anode, an electrolyte layer covering the dielectric layer, a cathode layer partly covering the electrolyte layer and an anode lead one end of which is joined to the anode and the other end of which extends beyond an exposed portion of the electrolyte layer exposed from the cathode layer. The solid electrolytic capacitor further includes: an anode terminal connected to the other end of the anode lead, a cathode terminal connected to the cathode layer, a resin layer and a resin outer package covering the capacitor element and the resin layer, wherein the resin layer covering the exposed portion of the electrolyte layer, the other end of the anode lead, and a connecting part between the other end of the anode lead and the anode terminal. The resin layer includes a first resin layer covering the exposed portion and a second resin layer covering the first resin layer, the first resin layer being softer than the second resin layer.

A described above, in the solid electrolytic capacitor according to the present invention, a resin layer is formed which covers the exposed portion, the other end of the anode lead and the connecting part between the other end of the anode lead and the anode terminal. In addition, the resin layer includes the first resin layer and the second resin layer, and the second resin layer is formed to cover the first resin layer. Therefore, the resin layer can reduce stress transmitted from the anode terminal through the anode lead to the dielectric layer in the molding process. Hence, the occurrence of cracks in the dielectric layer can be suppressed, and the leakage current can thereby be reduced. Furthermore, the first resin layer of the solid electrolytic capacitor according to the present invention is softer than the second resin layer thereof. Therefore, the first resin layer can reduce stress applied to the exposed portion of the electrolyte layer, and the second resin layer can mechanically reinforce the first resin layer to enhance the stress reduction effect of the first resin layer. Hence, the occurrence of cracks in a part of the dielectric layer in the vicinity of the exposed portion can be suppressed, and the leakage current can thereby be reduced.

In the present invention, the other end of the anode lead and the anode terminal may be connected to each other through a connecting member, and a connecting part between the other end of the anode lead and the connecting member may be covered with the resin layer.

In the present invention, the first resin layer preferably covers substantially the entire surface of the exposed portion.

In the present invention, a third resin layer is preferably formed to cover the cathode layer.

In the present invention, the penetration of the first resin layer is preferably within the range of 30 to 200.

The resin layer preferably covers a connecting part between the connecting member and the anode terminal. Thus, the stress transmitted from the anode terminal through the connecting member and the anode lead to the dielectric layer in the molding process can be further reduced. This suppresses the occurrence of cracks in the dielectric layer and thereby further reduces the leakage current.

According to the present invention, a solid electrolytic capacitor capable of reducing the leakage current can be provided.

DETAILED DESCRIPTION OF PREFERRED EMBODIMENTS

Figure 1:
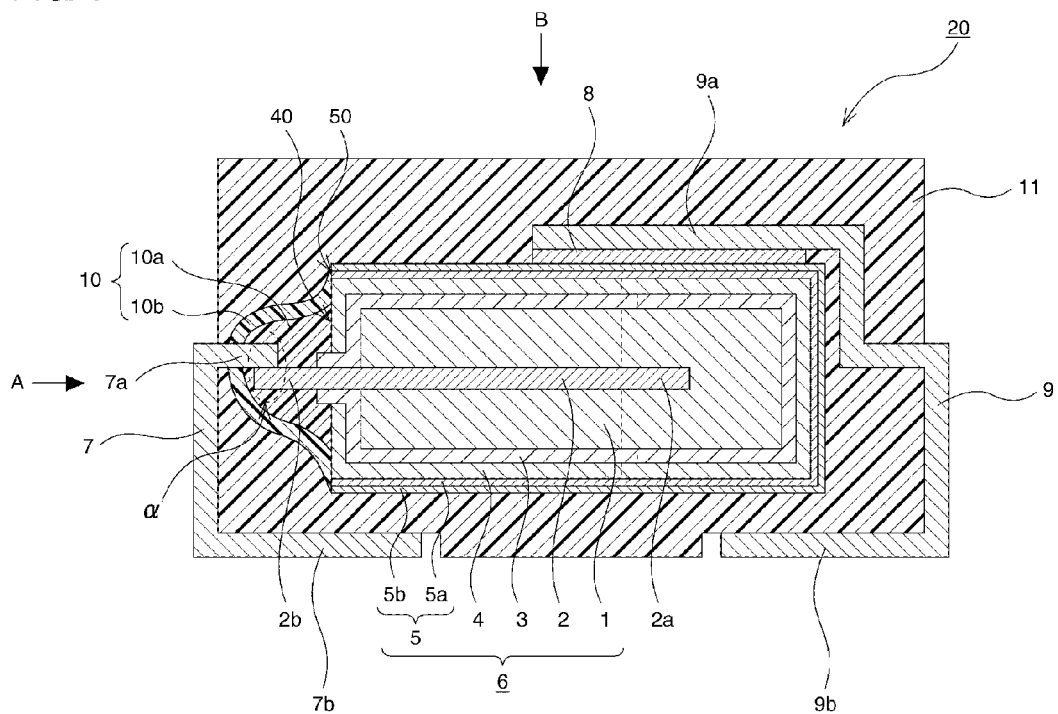
FIG. 1 is a cross-sectional view for illustrating a solid electrolytic capacitor according to a first embodiment.

Next, embodiments of the present invention will be described with reference to the drawings. Throughout the drawings described below, the same or like reference numerals refer to the same or like parts. However, it should be noted that each drawing is a schematic view and may represent different dimensional ratios and the like from those of the actual solid electrolytic capacitor. Therefore, specific dimensions and the like should be determined in consideration of the following descriptions. Furthermore, it is a matter of course that different drawings include elements which have different dimensional relations and ratios.

First Embodiment

FIG. 1 is a schematic cross-sectional view for illustrating the interior of a solid electrolytic capacitor according to this embodiment.

A solid electrolytic capacitor 20 according to this embodiment has the outer shape of a rectangular box. The solid electrolytic capacitor 20, as shown in FIG. 1, basically includes a capacitor element 6, an anode terminal 7, a cathode terminal 9, a resin outer package 11, and a resin layer 10 composed of a first resin layer 10a and a second resin layer 10b. These elements will be described below in an orderly sequence.

The capacitor element 6 includes an anode 1 made of a valve metal, an anode lead 2 provided so that its one end 2a is joined to the anode 1 and the other end 2b extends from the anode 1, a dielectric layer 3 formed by anodizing the anode 1, an electrolyte layer 4 covering the dielectric layer 3, and a cathode layer 5 covering the electrolyte layer 4.

The anode 1 is formed of a porous body made by pressing a large number of metal particles made of a valve metal into the shape of an anode and sintering it. One end 2a of the anode lead 2 made of a valve metal is embedded in the anode 1 so that the anode 1 and the anode lead 2 are joined together. The material used for the anode lead 2 may be the same metal as or a different valve metal from that for the anode 1. Examples of the valve metal forming the anode 1 and the anode lead 2 include niobium (Nb), tantalum (Ta), aluminum (Al) and titanium (Ti). Alternatively, an alloy containing one of the above valve metals as a main ingredient may be used for the anode 1 and/or the anode lead 2.

The dielectric layer 3 can be formed to cover the anode 1 by anodizing the anode 1. FIG. 1 shows the dielectric layer 3 made of an oxide layer formed on the outer surface of the anode 1. However, in actuality, since the anode 1 is a porous body as described above, the dielectric layer 3 is also formed on the wall surfaces of the pores in the porous body.

The electrolyte layer 4 is formed to cover the dielectric layer 3. An example of a material that can be used for the electrolyte layer 4 is a conductive polymer formed by chemical polymerization, electrolytic polymerization or like method. The electrolyte layer 4 may be formed of a single layer or formed of a plurality of layers. Typical materials for the conductive polymer include polypyrrole, polythiophene, polyaniline and polyfuran. FIG. 1 shows the electrolyte layer 4 formed on the dielectric layer 3 formed on the outer surface of the anode 1. However, the electrolyte layer 4 is also formed on the surface of part of the dielectric layer 3 formed on the wall surfaces of the pores in the porous body.

The cathode layer 5 is formed to partly cover the electrolyte layer 4, and has a layered structure in which a carbon layer 5a and a silver paste layer 5b are sequentially formed on the electrolyte layer 4. In this embodiment, the electrolyte layer 4 has an exposed portion 40 exposed from the cathode layer 5 in the vicinity of the other end 2b of the anode lead 2. The cathode layer 5 is not formed in the vicinity of the other end 2b of the anode lead 2 to prevent a short circuit with the anode lead 2. The carbon layer 5a is formed of a layer containing carbon particles. The silver paste layer 5b formed on the carbon layer 5a is formed of a layer containing silver particles.

Figure 2:
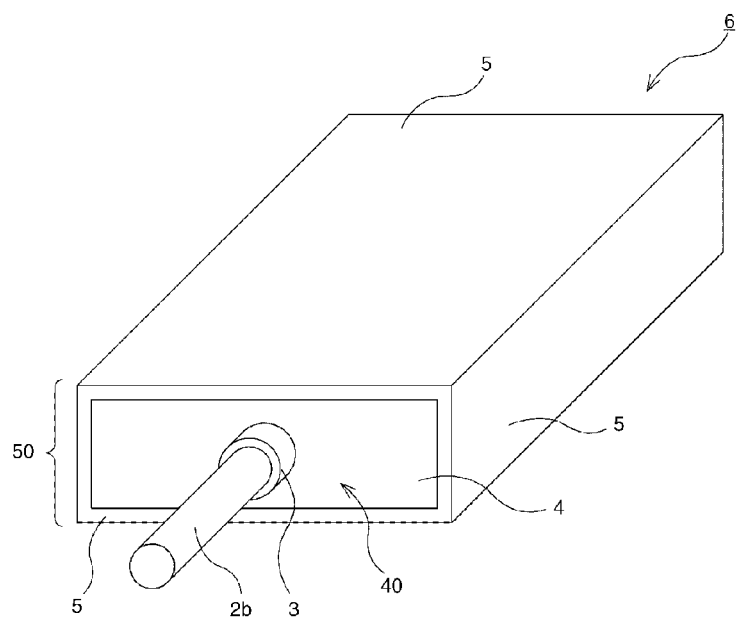
FIG. 2 is a cross-sectional view for illustrating a capacitor element in the first embodiment.

FIG. 2 is a perspective view of the capacitor element 6 when removed out of the solid electrolytic capacitor 20. As shown in FIG. 2, the electrolyte layer 4 has the exposed portion 40 exposed from the cathode layer 5, and the other end 2b of the anode lead extends from the exposed portion 40. Specifically, the electrolyte layer 4 has the exposed portion 40 exposed from the cathode layer 5 in a surface 50 of the capacitor element 6 that is a surface from which the other end 2b of the anode lead extends. Note that the cathode layer 5 may have any other structure that functions as a cathode.

The anode terminal 7 is attached to the anode lead 2. Specifically, the anode terminal 7 is formed by bending a metal strip. As shown in FIG. 1, the underside of one end 7a of the anode terminal 7 is mechanically and electrically connected to the other end 2b of the anode lead by welding or other means. The region a within the dashed circle in FIG. 1 indicates the connecting part between the anode lead and the anode terminal 7. This part is hereinafter referred to as a connecting part α.

The cathode terminal 9 is attached to the cathode layer 5. Specifically, the cathode terminal 9 is formed by bending a metal strip. As shown in FIG. 1, the underside of one end 9a of the cathode terminal 9 is bonded to the cathode layer 5 by a conductive adhesive 8, whereby the cathode terminal 9 and the cathode layer 5 are mechanically and electrically connected to each other. A specific example of a material for the conductive adhesive 8 is a silver paste made by mixing silver and epoxy resin.

Examples of materials for the anode terminal 7 and the cathode terminal 9 include copper, copper alloys and iron-nickel alloy (42 alloy).

Figure 3:
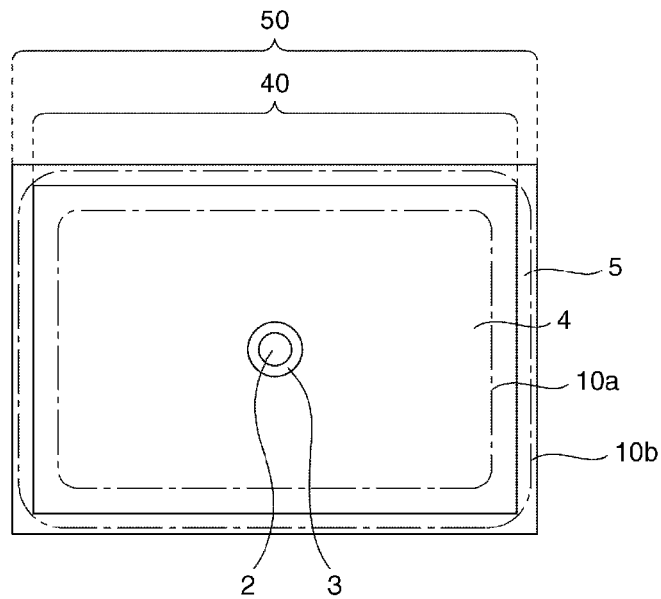
FIG. 3 shows cross-sectional views for illustrating the relative positions of first and second resin layers in the first embodiment.
Figure 3:
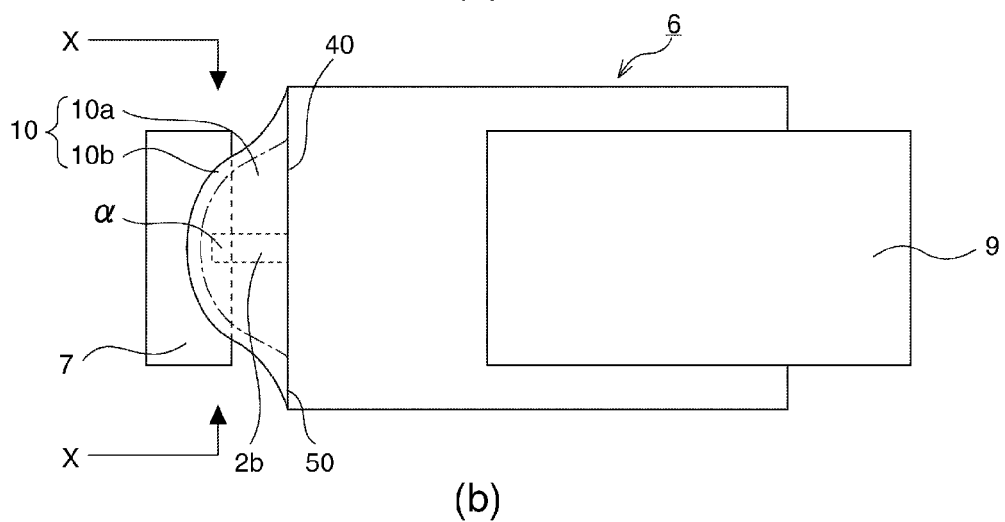
Figure 3:
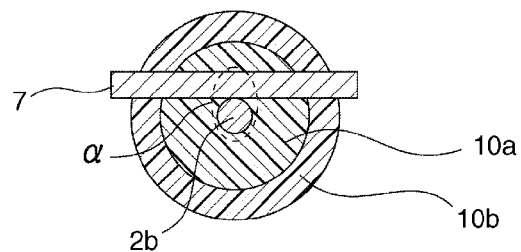

Next, the resin layer 10 will be described. The structure of the resin layer 10 will be described below in detail with reference to FIG. 1 as well as FIG. 3. FIG. 3 shows schematic views for illustrating the relative positions of the first and second resin layers 10a and 10b forming the resin layer 10.

As shown in FIG. 1, in this embodiment, the exposed portion 40, the other end 2b of the anode lead 2 and the connecting part α are covered with the resin layer 10. Specifically, the first resin layer 10a is formed to cover part of the exposed portion 40, extend from a part of the anode lead sticking out beyond the electrolyte layer 4 along the other end 2b thereof to the connecting part α and also cover the connecting part α. The second resin layer 10b is formed to cover the first resin layer 10a.

FIG. 3(a) shows the positions of the first and second resin layers 10a and 10b arranged in a region shown by the surface 50 of the capacitor element when viewed in the direction of the arrow A of FIG. 1. Referring to the figure, the first resin layer 10a arranged within a region shown in the dash-single-dot line covers a surrounding part of the other end 2b of the anode lead 2 within the exposed portion 40, and partly covers the exposed portion 40 at which the electrolyte layer 4 is exposed. The second resin layer 10b arranged within a region shown in the dash-double-dot line is formed around the first resin layer 10a, and formed to fully cover the remaining part of the exposed portion 40 in which no first resin layer 10a exists and reach the cathode layer 5.

FIG. 3(b) is a view of the solid electrolytic capacitor according to this embodiment when viewed in the direction of the arrow B of FIG. 1. Note that the overlapped parts of the anode lead 2, the second resin layer 10b and the anode terminal 7 are shown in the broken lines or the dash-single-dot line.

FIG. 3(c) is a cross-sectional view taken along the line X-X of FIG. 3(b). Note that in FIGS. 3(b) and 3(c) the resin outer package 11 is not given. Referring to FIG. 3(b), the first resin layer 10a is formed to cover the exposed portion 40, extend from the exposed portion 40 along the other end 2b of the anode lead 2 to the connecting part α and cover the connecting part α, and the second resin layer 10b covers the first resin layer 10a. Furthermore, referring to FIG. 3(c), the first resin layer 10a is formed to cover the connecting part α that is a part at which the strip-shaped anode terminal 7 is connected to the other end 2b of the anode lead 2. The first resin layer 10a thus formed is adhesively bonded to a part of the exposed portion 40, the other end 2b of the anode lead 2 and the anode terminal 7. The second resin layer 10b is adhesively bonded not only to the first resin layer 10a but also to another part of the exposed portion 40, a part of the cathode layer 5 formed in the surface 50 of the capacitor element 6, and the anode terminal 7.

Materials that can be used as the first and second resin layers 10a and 10b include various kinds of insulating resins, such as silicon resin and epoxy resin. In this case, the first resin layer 10a is softer than the second resin layer 10b. Specifically, the penetration of the first resin layer 10a is greater than that of the second resin layer 10b. The penetration is a characteristic representing the resin hardness. The greater its numerical value, the softer the resin.

The resin outer package 11 is formed to cover the surroundings of the capacitor element 6, the anode terminal 7, the cathode terminal 9 and the second resin layer 10b that are arranged in the above manner. The other end 7b of the anode terminal 7 and the other end 9b of the cathode terminal 9 are exposed from the resin outer package 11 to extend from its side surfaces to its bottom surface. The exposed portions of the terminals 7 and 9 can be used for soldering to a substrate. Examples of materials that can be used for the resin outer package 11 include materials functioning as sealants. Specific examples of such materials include epoxy resin and silicon resin. The resin outer package 11 can be formed by curing a resin prepared by appropriately mixing a base resin, a hardener and a filler.

Functions and Effects

In the solid electrolytic capacitor 20 according to this embodiment, the exposed portion 40, the other end 2b of the anode lead 2 and the connecting part α are covered with a resin layer 10 composed of first and second resin layers 10a and 10b. Since the other end 2b of the anode lead 2 is covered with the resin layer 10, it can be prevented that in the molding process the resin for forming the resin outer package 11 comes into direct contact with the other end 2b of the anode lead 2. Therefore, transmission of stress generated by a pouring pressure through the anode lead 2 to the dielectric layer 3 can be suppressed. In addition, even if the stress generated by a pouring pressure is transmitted to the anode terminal 7 having a large surface area, the resin layer 10 formed from around the other end 2b of the anode lead 2 to around the connecting part α can suppress transmission of the stress from the anode terminal 7 through the anode lead 2 to the dielectric layer 3. Therefore, in the solid electrolytic capacitor 20 according to this embodiment, the occurrence of cracks in the dielectric layer 3 can be suppressed, and the leakage current can thereby be reduced.

Furthermore, the first resin layer 10a of the solid electrolytic capacitor 20 according to this embodiment is softer than the second resin layer 10b thereof. Therefore, the first resin layer 10a can reduce stress applied to the exposed portion 40 of the electrolyte layer 4, and the second resin layer 10b can mechanically reinforce the first resin layer 10a to enhance the stress reduction effect of the first resin layer 10a on the exposed portion 40. As a result, the occurrence of cracks in the dielectric layer 3 can be suppressed, and the leakage current can thereby be reduced.

In addition, the connecting part α of the solid electrolytic capacitor 20 according to this embodiment is covered with the first resin layer 10a softer than the second resin layer 10b. Therefore, stress applied to the connecting part α in the molding process can be reduced, which further suppresses the stress transmitted from the anode terminal 7 through the anode lead 2 to the dielectric layer 3.

In this embodiment, after the connection between the anode lead 2 and the anode terminal 7 and before the formation of the resin outer package 11, the first resin layer 10a is formed on the exposed portion 40 and from around the other end 2b of the anode lead 2 to around the connecting part α, and the second resin layer 10b is formed to cover the first resin layer 10a. Therefore, the anode lead 2, the anode terminal 7 and the capacitor element 6 are rigidly held by the resin layer 10 prior to the molding process. Thus, the stress transmitted from the anode terminal 7 through the anode lead 2 to the dielectric layer 3 in the molding process can be reduced. Accordingly, the occurrence of cracks in the dielectric layer 3 can be suppressed, and the leakage current can thereby be reduced.

(Modification 1 of First Embodiment)

Next will be described below a solid electrolytic capacitor 25 according to Modification 1 of the first embodiment. Note that the following description is made mainly of the formation of a third resin layer 13, which is a difference from the above described first embodiment.

Figure 4:
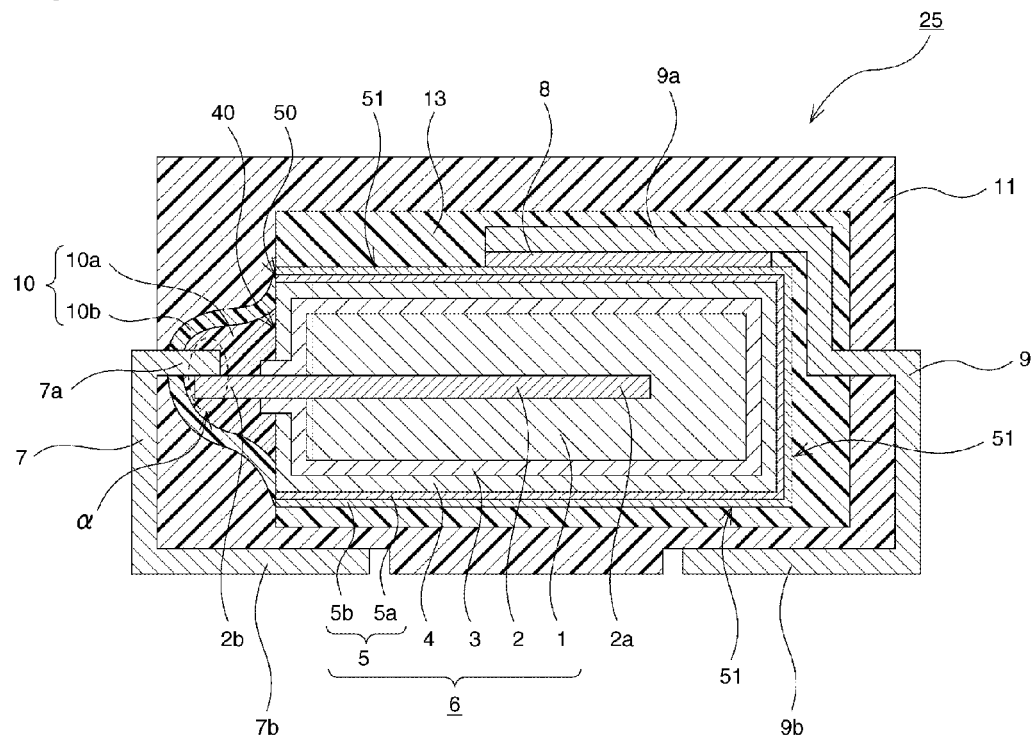
FIG. 4 is a cross-sectional view for illustrating a solid electrolytic capacitor according to Modification 1 of the first embodiment.

FIG. 4 is a cross-sectional view for schematically illustrating the interior of the solid electrolytic capacitor 25 according to this modification.

As shown in FIG. 4, in this modification, a third resin layer 13 covers surfaces 51 of the capacitor element 6 in which the cathode layer 5 is formed. Note that the third resin layer 13 is adhesively bonded not only to the surfaces 51 of the capacitor element 6 but also to the cathode terminal 9.

Materials that can be used for the third resin layer include various kinds of insulating resins, such as silicon resin and epoxy resin. Preferably, the third resin layer 13 is made of a softer resin than the resin outer package 11.

In the above manner, the surfaces 51 of the capacitor element 6, at which the cathode layer 5 is exposed with the anode and cathode terminals 7 and 9 connected to the capacitor element 6, are further covered with the third resin layer 13. Thus, application of stress during formation of the resin outer package 11 to the entire dielectric layer 3 can be suppressed. If the third resin layer 13 is softer than the resin outer package 11, application of the above stress to the dielectric layer 3 can be further suppressed.

Furthermore, the third resin layer 13 is adhesively bonded to the capacitor element 6 to encapsulate the portion of the cathode terminal 9 connected with the cathode layer 5 and an adjacent portion thereof. This prevents the resin outer package 11 from entering the bonding surface between the cathode terminal 9 and the capacitor element 6 in the molding process, thereby preventing decrease in adhesive strength.

(Modification 2 of First Embodiment)

Next will be described below a solid electrolytic capacitor 26 according to Modification 2 of the first embodiment. Note that the following description is made mainly of the formation of a fourth resin layer 14, which is a difference from the above described Modification 1 of the first embodiment.

Figure 5:
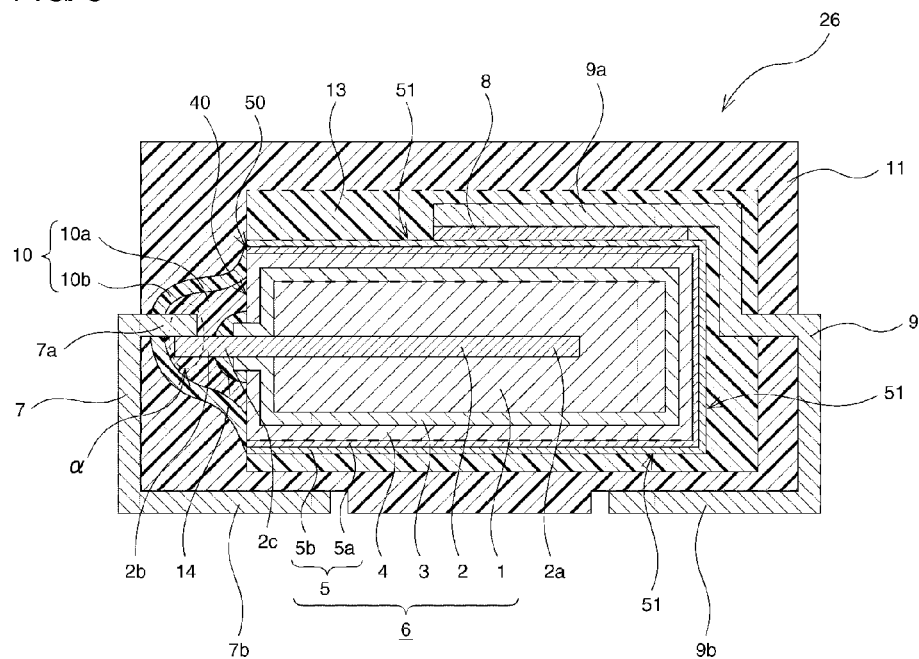
FIG. 5 is a cross-sectional view for illustrating a solid electrolytic capacitor according to Modification 2 of the first embodiment.

FIG. 5 is a cross-sectional view for schematically illustrating the interior of the solid electrolytic capacitor 26 according to this modification. As shown in the figure, in this modification, a forth resin layer 14 is formed around the root 2c of the anode lead 2, which is a part at which the anode lead 2 extends from the surface 50 of the capacitor element 6.

Materials that can be used for the fourth resin layer 14 include various kinds of insulating resins, such as epoxy resin, silicon resin and fluorine-contained resin. Preferably, the fourth resin layer 14 is made of a harder resin than the first resin layer 10a.

A clearance is likely to be created between the dielectric layer 3 and the anode lead 2 in the vicinity of the root 2c of the anode lead 2. Therefore, by covering the root 2c of the anode lead with the forth resin layer 14, such a clearance can be filled in to reinforce the root 2c of the anode lead. Thus, the fourth resin layer 14 restrains the anode lead 2 from being moved by stress generated in the molding process. This suppresses the occurrence of cracks in a part of the dielectric layer 3 in the vicinity of the root 2c of the anode lead and thereby further reduces the leakage current. If the fourth resin layer 14 is made of a harder resin than the first resin layer 10a, the above reinforcing effect can be enhanced.

Second Embodiment

Next will be described below a solid electrolytic capacitor 21 according to a second embodiment. Note that the following description is made mainly of the formation of a resin layer 10, which is a difference from the above described first embodiment.

Figure 6:
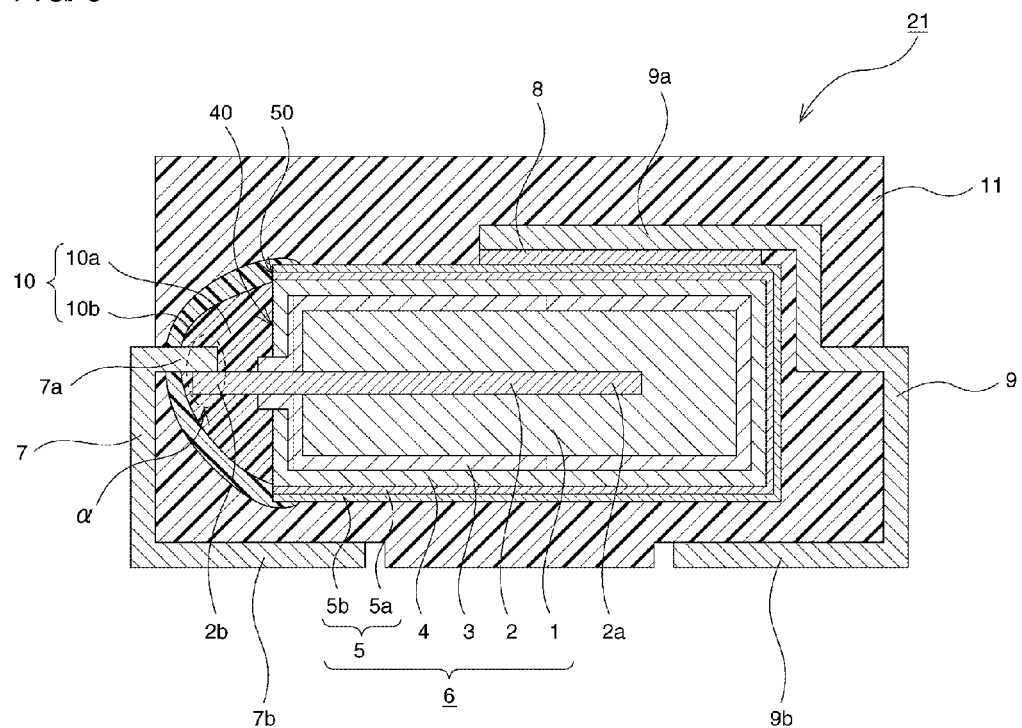
FIG. 6 is a cross-sectional view for illustrating a solid electrolytic capacitor according to a second embodiment.

FIG. 6 is a cross-sectional view for schematically illustrating the interior of the solid electrolytic capacitor 21 according to this embodiment. Also in this embodiment, the exposed portion 40, the other end 2b of the anode lead 2 and the connecting part α are covered with a resin layer 10.

As shown in the figure, a first resin layer 10a is formed to cover the connecting part α, then extend around the anode lead 2 and then cover the entire surface of the exposed portion 40. A second resin layer 10b is formed to cover the first resin layer 10a, fully cover the surface 50 of the capacitor element and lie partly on other surfaces of the capacitor element beyond the surface 50.

This structure also performs the same effects as in the first embodiment.

In addition, in this embodiment, the entire surface of the exposed portion 40 is covered with the first resin layer 10a softer than the second resin layer 10b.

Thus, the first resin layer 10a can further reduce the stress applied to the exposed portion 40 of the electrolyte layer 4.

Third Embodiment

Next will be described below a solid electrolytic capacitor 22 according to a third embodiment. Note that the following description is made mainly of the formation of a resin layer 10, which is a difference from the previously described first embodiment.

Figure 7:
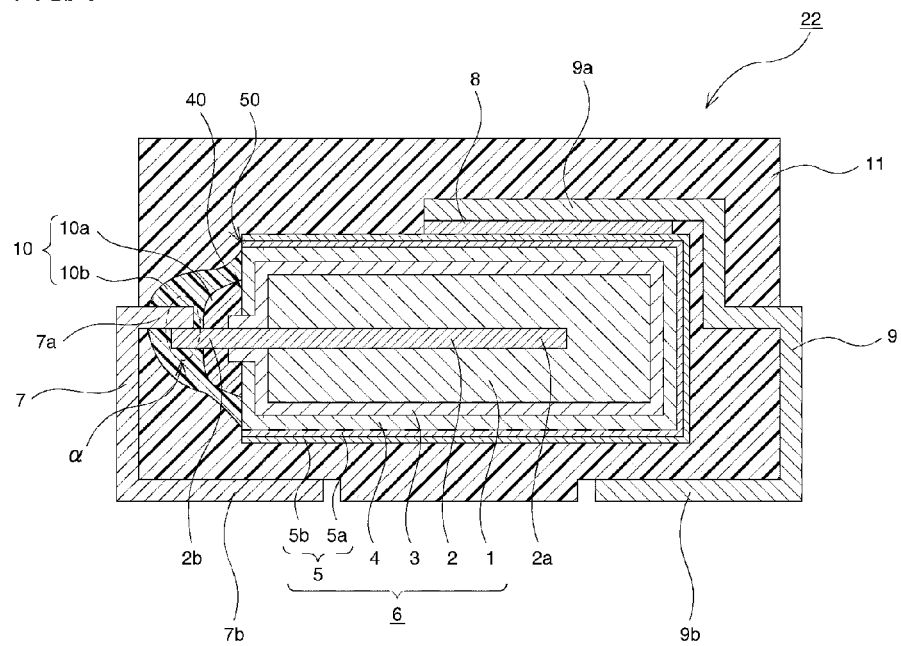
FIG. 7 is a cross-sectional view for illustrating a solid electrolytic capacitor according to a third embodiment.

FIG. 7 is a cross-sectional view for schematically illustrating the interior of the solid electrolytic capacitor 22 according to this embodiment.

As shown in the figure, a first resin layer 10a is formed on part of the exposed portion 40 and around part of the other end 2b of the anode lead 2, but does not exist around the connecting part α. Instead of this, a second resin layer 10b is formed to cover the connecting part α and cover substantially the entire surface of the exposed portion 40.

Although this embodiment has the above structure, part of the exposed portion 40 is covered with the first resin layer 10a softer than the second resin layer 10b.

Therefore, the first resin layer 10a can reduce the stress applied to the exposed portion 40 of the electrolyte layer 4.

Fourth Embodiment

Next will be described below a solid electrolytic capacitor 30 according to a fourth embodiment. Note that the following description is made mainly of the placement of two capacitor elements, i.e., first and second capacitor elements 6A and 6B, in the solid electrolytic capacitor and the formation of a resin layer 10, which are differences from the previously described first embodiment. The first capacitor element 6A and the second capacitor element 6B are formed in the same manner as the capacitor element 6 in the first embodiment.

FIG. 8(a) is a cross-sectional view for schematically illustrating the interior of the solid electrolytic capacitor 30 according to this embodiment. As shown in this figure, in this embodiment, the first and second capacitor elements 6A and 6B are placed pairwise in the solid electrolytic capacitor 30. FIG. 8(b) is a cross-sectional view taken along the line C-C of FIG. 8(a). Note that in FIG. 8(b) the resin outer package 11 is not given.

The top side of one end 7a of the anode terminal 7 is connected to the other end 2b of the anode lead 2 of the first capacitor element 6A through a first connecting member 12A described hereinafter. The underside of the one end 7a of the anode terminal 7 is connected to the other end 2b of the anode lead 2 of the second capacitor element 6B through a second connecting member 12B described hereinafter. In this embodiment, as shown in the above figures, a connecting part α1 refers to a part at which the other end 2b of the anode lead 2 of the first capacitor element 6A is connected to the first connecting member 12A, and a connecting part α2 refers to a part at which the other end 2b of the anode lead 2 of the second capacitor element 6B is connected to the second connecting member 12B. The connection of these members may be made by welding or with a conductive adhesive.

The material for the connecting members 12A and 12B may be any material exhibiting electrical conductivity. Examples of the material include metallic materials and conductive adhesives. Various shapes of the connecting members 12A and 12B may be employed, such as a pillar shape or a plate-like shape. If the connecting members are made of a metallic material, the metallic material may be the same material as the anode leads or may be the same material as the anode terminal. Alternatively, the anode terminal 7 may be directly connected to the anode leads 2, for example, by bending or deforming parts of the anode leads 2 and connecting them to the anode terminal 7. In such a case, the parts of the anode leads 2 connected to the anode terminal 7 function as connecting members. Alternatively, the anode terminal 7 may be directly connected to the anode leads 2, for example, by bending or deforming parts of the anode terminal 7 and connecting them to the anode leads 2. In such a case, the parts of the anode terminal 7 connected to the anode leads 2 function as connecting members.

The top side of one end 9a of the cathode terminal 9 is connected to the underside of the cathode layer 5 of the first capacitor element 6A by a conductive adhesive 8. The underside of the one end 9a of the cathode terminal 9 is connected to the top side of the cathode layer 5 of the second capacitor element 6B by a conductive adhesive 8.

A first resin layer 10a is, as shown in FIG. 8(a), formed to cover the exposed portion 40 of the first capacitor element 6A, then extend from the exposed portion 40 along the anode lead 2 and then cover the connecting part α1, and formed to cover the exposed portion 40 of the second capacitor element 6B, then extend from the exposed portion 40 along the anode lead 2 and then cover the connecting part α2. In this embodiment, as shown in FIGS. 8(a) and 8(b), the first resin layer 10a is formed not only around the connecting parts α1 and α2 but also around the connecting members 12A and 12B and around the region in which the end 7a of the anode terminal 7 is connected to the connecting members 12A and 12B. Note that in this embodiment the first resin layer 10a is integrally formed from the first capacitor element 6A to the second capacitor element 6B, a first resin layer 10a on the first capacitor element 6A and a first resin layer 10a on the second capacitor element 6B may be formed separately.

As shown in FIGS. 8(a) and 8(b), a second resin layer 10b is provided to cover the first resin layer 10a provided around the connecting parts α1 and α2. Furthermore, the second resin layer 10b is adhesively bonded not only to the first resin layer 10a but also to the surfaces 50 of the capacitor elements 6A and 6B and the anode terminal 7. Like the first resin layer 10a, the second resin layer 10b is integrally formed from the first capacitor element 6A to the second capacitor element 6B. However, a second resin layer 10b on the first capacitor element 6A and a second resin layer 10b on the second capacitor element 6B may be formed separately.

Such a solid electrolytic capacitor including two capacitor elements 6A and 6B can also perform the same effects as in the previously described embodiments, if a resin layer 10 composed of a first resin layer 10a and a second resin layer 10b is formed as described above.

Furthermore, if, in the case of the cathode terminal 9 connected between the first and second capacitor elements 6A and 6B like this embodiment, the resin layer 10 is integrally formed from the first capacitor element 6A to the second capacitor element 6B, this prevents the resin outer package 11 from entering the bonding surfaces of the cathode terminal 9 to the first and second capacitor elements 6A and 6B through the surfaces 50 of the capacitor elements, and thereby prevents decrease in adhesive strength.

In this embodiment, the first and second capacitor elements 6A and 6B are arranged to be stacked vertically with respect to the bottom surface of the solid electrolytic capacitor 30 having the other end 7b of the anode terminal and the other end 9b of the cathode terminal, which are parts to be mounted on a substrate. However, the arrangement of the capacitor elements are not limited to this and various arrangements can be employed. For example, two capacitor elements may be horizontally aligned in parallel with the bottom surface of the solid electrolytic capacitor 30. In this embodiment, the resin layer 10 is formed on both the first and second capacitor elements 6A and 6B. However, the resin layer 10 may be formed only on one of the first and second capacitor elements 6A and 6B.

Furthermore, even if the solid electrolytic capacitor includes a single capacitor element, the anode lead 2 and the anode terminal 7 may be connected to each other through a connecting member.

(Modification 1 of Fourth Embodiment)

Next will be described below a solid electrolytic capacitor 31 according to Modification 1 of the fourth embodiment. Note that the following description is made mainly of the formation of a third resin layer 13, which is a difference from the above described fourth embodiment.

Figure 9:
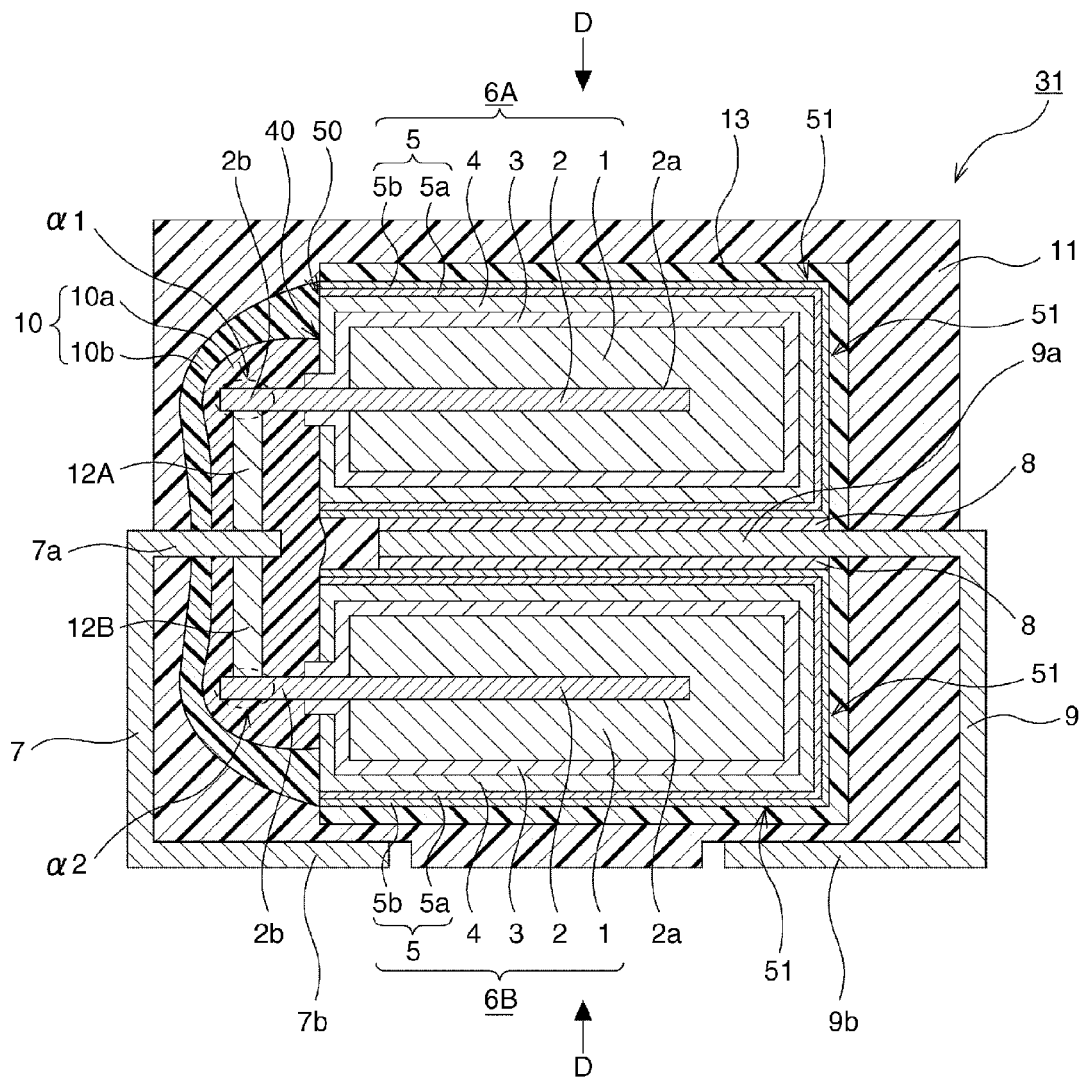
FIG. 9 is a cross-sectional view for illustrating a solid electrolytic capacitor according to Modification 1 of the fourth embodiment.
Figure 10:
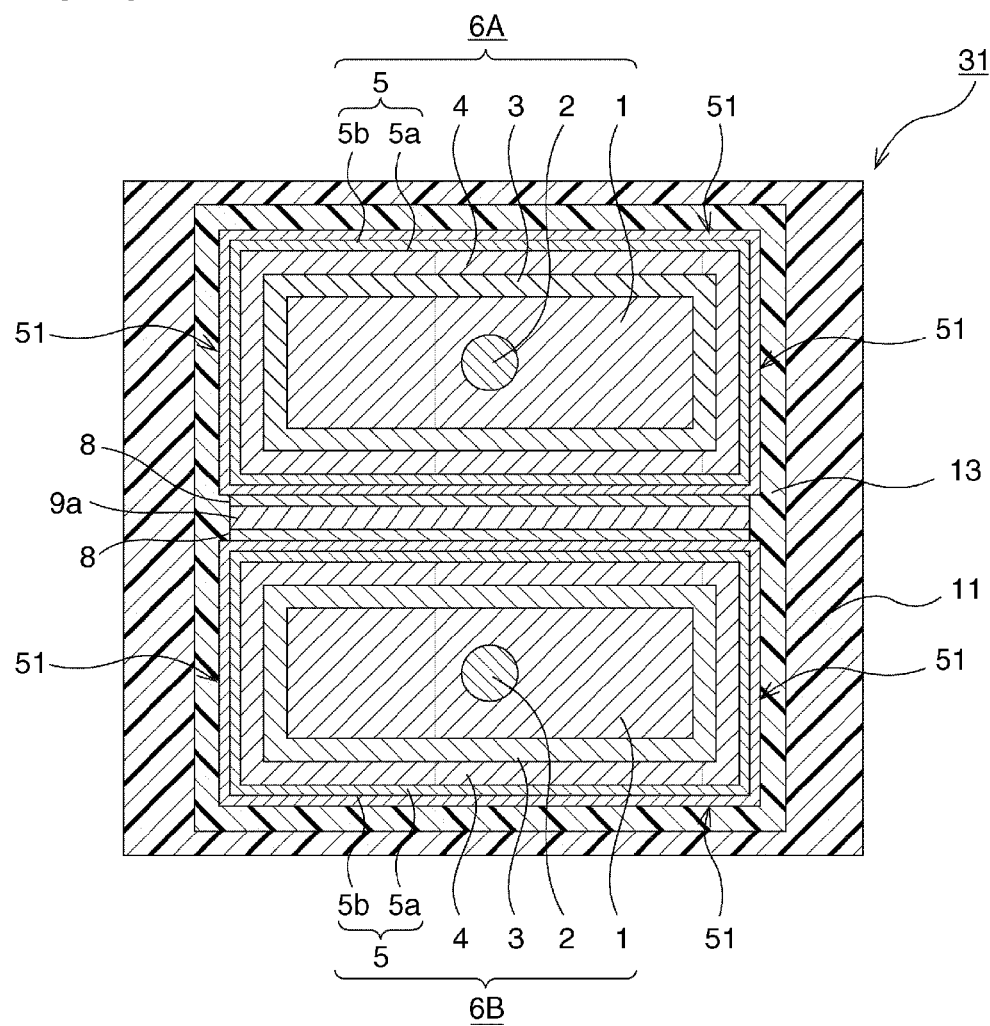
FIG. 10 is a cross-sectional view taken along the line D-D of FIG. 9.

FIG. 9 is a cross-sectional view for schematically illustrating the interior of the solid electrolytic capacitor 31 according to this modification. FIG. 10 is a cross-sectional view taken along the line D-D of FIG. 9.

As shown in FIGS. 9 and 10, in this modification, a third resin layer 13 covers the surfaces 51 of the first and second capacitor elements 6A and 6B, except for the surfaces 50 of the capacitor elements 6A and 6B, the under surface of the first capacitor element 6A connected with the cathode terminal 9 and the top surface of the second capacitor element 6B connected with the cathode terminal 9. Note that the third resin layer 13 is adhesively bonded not only to the surfaces 51 of the capacitor elements 6A and 6B but also to the cathode terminal 9.

Materials that can be used for the third resin layer include various kinds of insulating resins, such as silicon resin and epoxy resin. Preferably, the third resin layer 13 is made of a softer resin than the resin outer package 11.

In the above manner, the surfaces 51 of the capacitor elements 6A and 6B, at which the cathode layers 5 are exposed with the anode and cathode terminals 7 and 9 connected to the capacitor elements 6A and 6B, are further covered with the third resin layer 13. Thus, application of stress during formation of the resin outer package 11 to the entire dielectric layers 3 can be suppressed. If the third resin layer 13 is softer than the resin outer package 11, application of the above stress to the dielectric layers 3 can be further suppressed.

Furthermore, the third resin layer 13 is adhesively bonded also to the cathode terminal 9. This prevents the resin outer package 11 from entering the bonding surfaces of the cathode terminal 9 to the first and second capacitor elements 6A and 6B in the molding process, thereby preventing decrease in adhesive strength.

(Modification 2 of Fourth Embodiment)

Next will be described below a solid electrolytic capacitor 32 according to Modification 2 of the fourth embodiment. Note that the following description is made mainly of the formation of fourth resin layers 14, which is a difference from the above described Modification 1 of the fourth embodiment.

Figure 11:
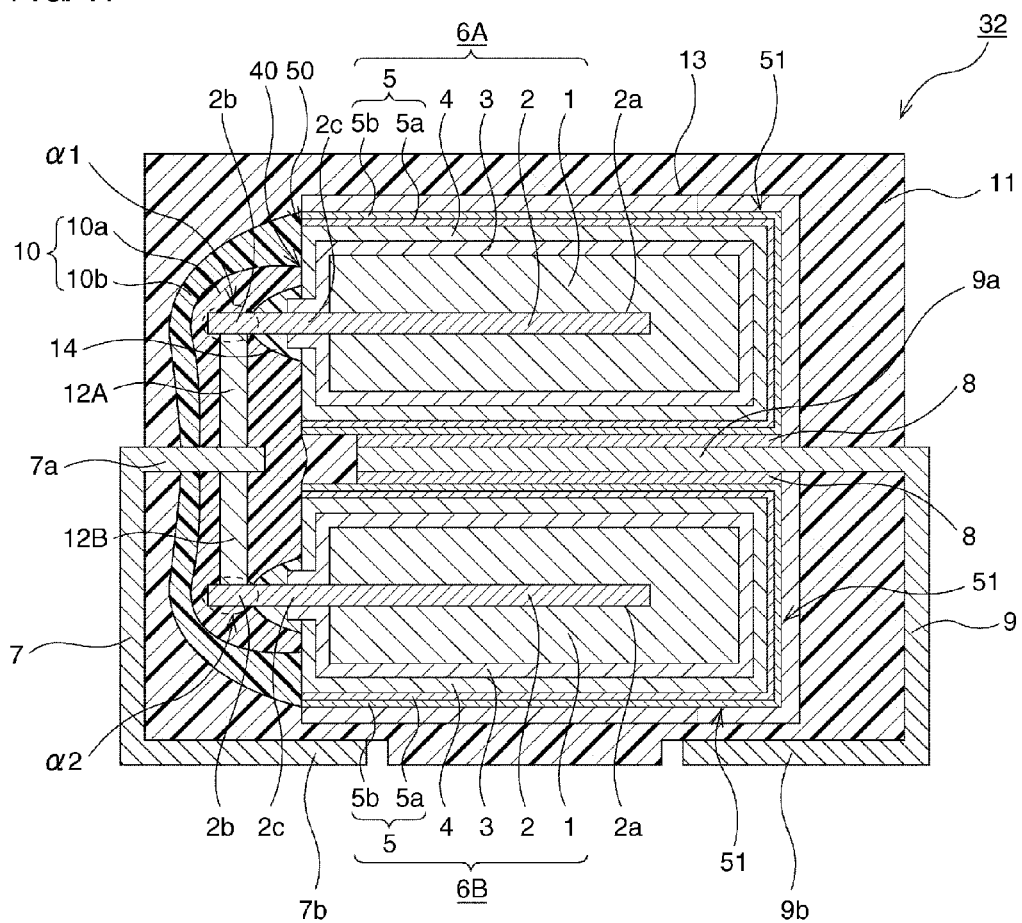
FIG. 11 is a cross-sectional view for illustrating a solid electrolytic capacitor according to Modification 2 of the fourth embodiment.

FIG. 11 is a cross-sectional view for schematically illustrating the interior of the solid electrolytic capacitor 32 according to this modification. As shown in the figure, in this modification, a forth resin layer 14 is formed around each of the roots 2c of the anode leads 2, which are parts at which the anode leads 2 extend from the surfaces 50 of the capacitor elements 6A and 6B.

Materials that can be used for the fourth resin layers 14 include various kinds of insulating resins, such as epoxy resin, silicon resin and fluorine-contained resin. Preferably, the fourth resin layers 14 are made of a harder resin than the first resin layer 10a.

A clearance is likely to be created between each dielectric layer 3 and the associated anode lead 2 in the vicinity of the root 2c of the anode lead 2 during bonding between the dielectric layer 3 and the anode lead 2. Therefore, by covering the root 2c of each anode lead with the forth resin layer 14, such a clearance can be filled in to reinforce the root 2c of the anode lead. Thus, the fourth resin layers 14 restrain the anode leads 2 from being moved by stress generated in the molding process. This suppresses the occurrence of cracks in parts of the dielectric layers 3 in the vicinity of the roots 2c of the anode leads and thereby further reduces the leakage current. If the fourth resin layers 14 are made of a harder resin than the first resin layer 10a, the above reinforcing effect can be enhanced.

Example 1

Hereinafter will be described Example 1 in which niobium is used for the anode in the solid electrolytic capacitor according to the first embodiment.

Figure 12:
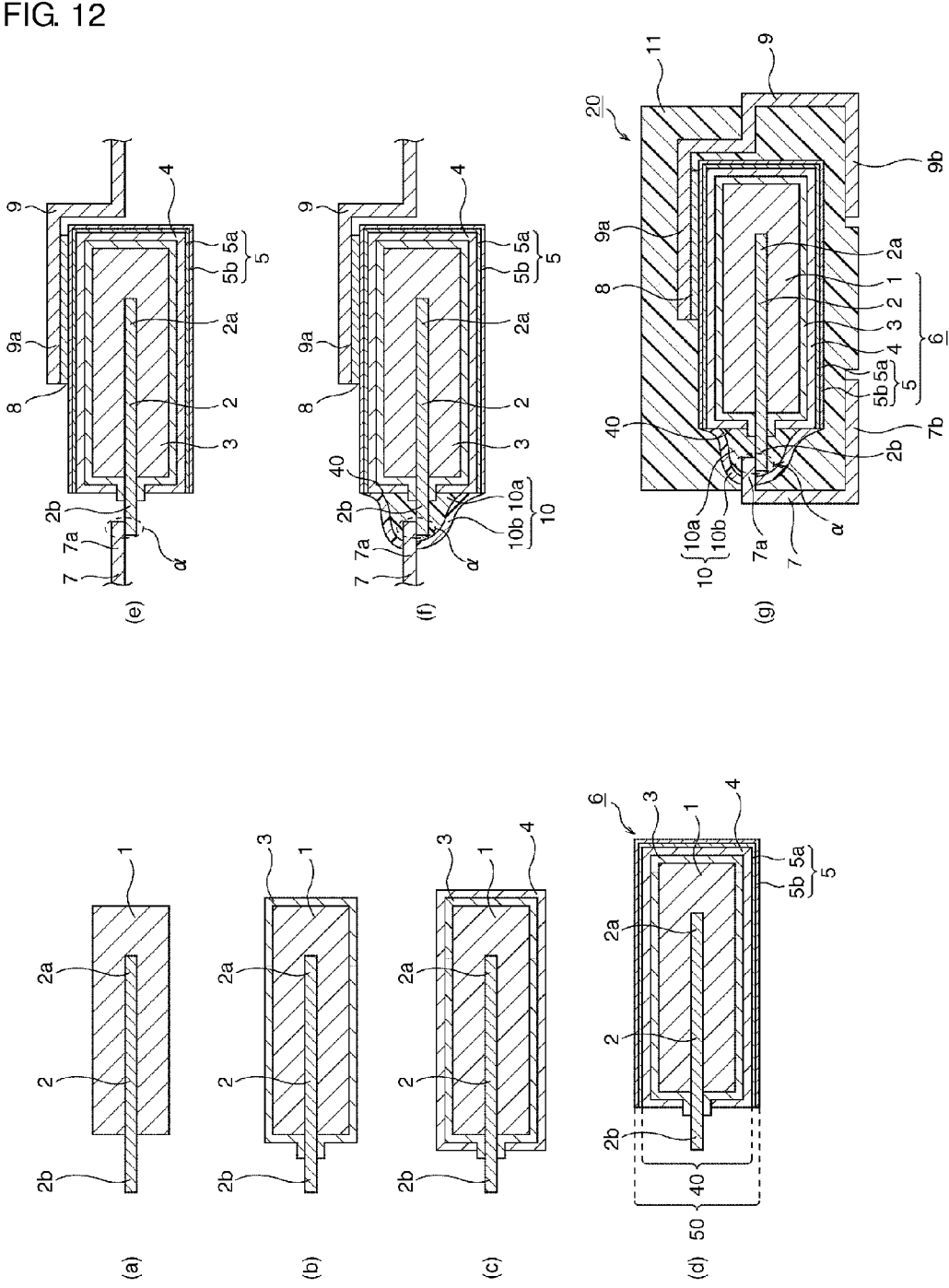
FIG. 12 shows cross-sectional views for illustrating a process for producing a solid electrolytic capacitor according to Example 1.

FIG. 12 shows views illustrating a process for producing a solid electrolytic capacitor according to Example 1.

<Step 1: Formation of Anode>

As shown in FIG. 12(a), valve metal powder made of niobium metal and having a primary particle size of approximately 0.5 μm was pressed into the shape of an anode 1 with one end 2a of an anode lead 2 embedded therein, and sintered in vacuum, thereby forming an anode 1. Thus, the other end 2b of the anode lead 2 was fixed in a state extended from one surface of the anode 2. The anode 1 made of a porous sintered body thus formed had the outer shape of a rectangular box with a length of 4.4 mm in the direction of extension of the anode lead 2, a width of 3.3 mm and a thickness of 1.0 mm.

Although niobium was used for the anode in this example, various kinds of valve metals, such as tantalum, and their alloys can be used for the anode. A dielectric layer formed by using niobium as an anode material and anodizing it is more likely to cause oxygen diffusion and defects and therefore more likely to increase the leakage current than a dielectric layer formed by using tantalum as an anode material and anodizing it. Therefore, the effects of the invention are most desired for solid electrolytic capacitors using niobium as their anodes. Such a solid electrolytic capacitor was produced as this example and examined as described below.

<Step 2: Formation of Dielectric Layer>

As shown in FIG. 12(b), a dielectric layer 3 formed of an oxide layer was formed on the surface of the anode 1 by anodizing the anode 1. Specifically, anodization was implemented by immersing the anode 1 in an approximately 0.1% by weight aqueous solution of ammonium fluoride held at approximately 40° C. and applying a constant voltage of approximately 10 V to the anode 1 for approximately ten hours. Thereafter, another anodization was implemented by immersing the anode 1 in a 0.5% by weight aqueous solution of phosphoric acid and applying a constant voltage of approximately 10 V to the anode 1 for approximately two hours, thereby forming a dielectric layer 3 containing fluorine.

<Step 3: Formation of Electrolyte Layer>

As shown in FIG. 12(c), an electrolyte layer 4 made of polypyrrole was formed on the surface of the dielectric layer 3 by chemical polymerization or other methods.

<Step 4: Formation of Cathode Layer>

As shown in FIG. 12(d), a carbon layer 5a was formed by applying carbon paste on the surface of the electrolyte layer 4 and drying it, and a silver paste layer 5b was then formed by applying silver paste on the carbon layer 5a and drying it. In this example, the cathode layer 5 was composed of the carbon layer 5a and the silver paste layer 5b.

Through the above Steps 1 to 4, a capacitor element 6 was formed. The outer shape of the capacitor element 6 thus formed (exclusive of the extension of the anode lead 2b) was a rectangular box shape like the outer shape of the anode 1, because the dielectric layer 3, the electrolyte layer 4 and the cathode layer 5 all formed on the anode 1 had small thicknesses. The cathode layer was coated on, out of all the surfaces forming the rectangular box, five surfaces of the capacitor element other than the surface 50. Therefore, an exposed portion 40 of the electrolyte layer 4 exposed from the cathode layer 5 was formed in the surface 50 of the capacitor element.

<Step 5: Connection of Anode Terminal and Cathode Terminal>

As shown in FIG. 12(e), an end 7a of an anode terminal 7 was electrically and mechanically connected to an end 2b of the anode lead 2 by welding or other means. The end 2b of the anode lead 2 and the end 7a of the anode terminal 7 were connected at a connecting part α as shown in the figure. Furthermore, an end 9a of a cathode terminal 9 was electrically and mechanically connected to a surface of the cathode layer 5 by a conductive adhesive 8.

<Step 6: Formation of Resin Layer 10 Composed of First Resin Layer 10a and Second Resin Layer 10b>

As shown in FIG. 12(f), a first resin layer 10a made of silicon resin was formed to cover the connecting part α, which is a part at which the anode terminal 7 and the anode lead were connected to each other in Step 5, continue from the connecting part α along the anode lead to the exposed portion 40 and cover part of the exposed portion 40. Next, a second resin layer 10b made of silicon resin was formed to entirely cover the first resin layer 10a and the exposed portion 40.

Specifically, the silicon resin used was Part No. TSE3070 manufactured by Momentive Performance Materials Japan LLC. To form the first resin layer 10a, 100 parts by weight of solution of TSE3070(A) was blended with 100 parts by weight of solution of TSE3070(B) and the blended solution was uniformly stirred to prepare a resin. Thereafter, the resin was applied with a dispenser to cover the specific parts described above and cured at 70° C. for 30 minutes, thereby forming a first resin layer 10a made of silicon resin. The penetration of the first resin layer 10a thus formed was measured according to JIS K6249. The measured penetration was 65.

To form the second resin layer 10b, 100 parts by weight of solution of TSE3070(A) was blended with 130 parts by weight of solution of TSE3070(B) and the blended solution was uniformly stirred to prepare a resin. Thereafter, the resin was applied with a dispenser to cover the specific parts described above and cured at 70° C. for 30 minutes, thereby forming a second resin layer 10b made of silicon resin. The penetration of the second resin layer 10b thus formed was measured according to JIS K6249. The measured penetration was 15.

A resin layer 10 was formed by sequentially forming the first and second resin layers 10a and 10b in the above manner.

Note that the penetration is a characteristic representing the resin hardness, and the greater its numerical value, the softer the resin.

<Step 7: Molding Process>

As shown in FIG. 12(g), the capacitor element 6 subjected to Steps 1 to 6 was encapsulated by transfer molding with a sealant containing epoxy resin and an imidazole compound to allow the anode and cathode terminals to be partly exposed to the outside, thereby forming a resin outer package 11. Specifically, the sealant previously heated at 160° C. was poured into a mold under a pressure of 80 kg/cm², and cured in the mold under conditions of 160° C. for 90 seconds. After the formation of the resin outer package 11, the exposed parts of the anode and cathode terminals were bent from the lateral sides of the resin outer package 11 to the bottom surface thereof, thereby forming terminal ends 7b and 9b to be used for soldering to a substrate. The penetration of the resin outer package 11 was below 10.

Reference Examples 1 to 10

Figure 13:
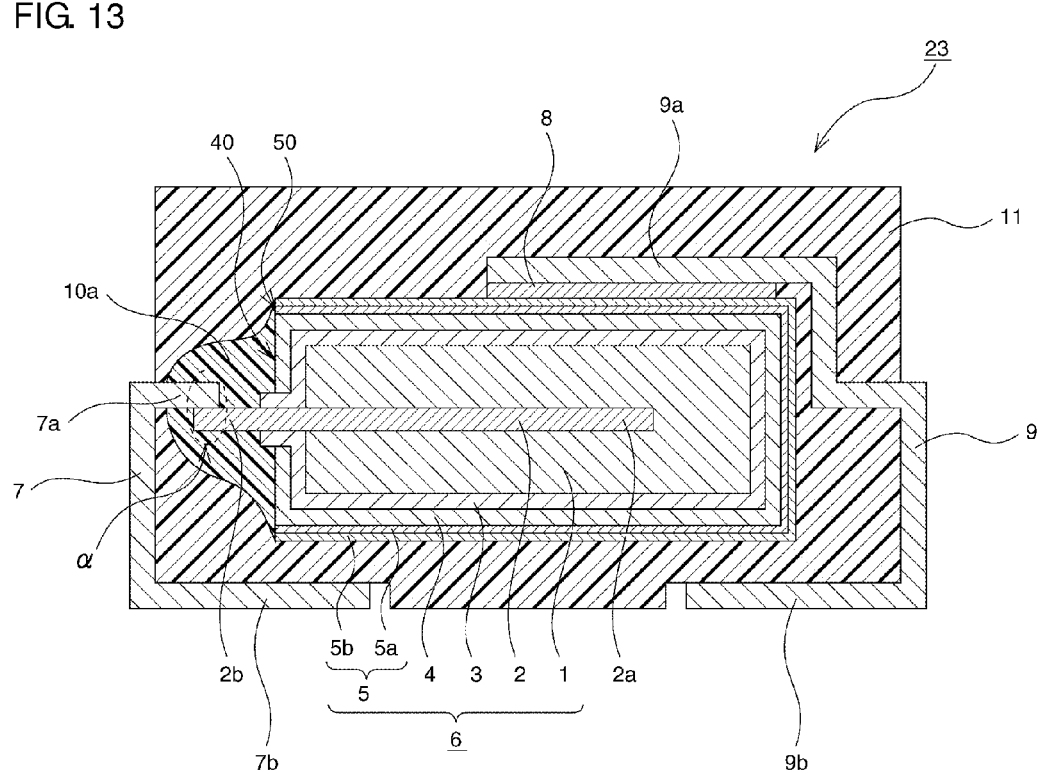
FIG. 13 is a cross-sectional view for illustrating solid electrolytic capacitors according to Reference Examples 1 to 10.

FIG. 13 is a cross-sectional view showing solid electrolytic capacitors 23 according to Reference Examples 1 to 10 in which the second resin layer 10b is not formed unlike Example 1. To obtain the index for selecting a suitable resin material for the first resin layer 10a to be in contact with the exposed portion 40, the effect of a solid electrolytic capacitor having only a first resin layer 10a formed as a resin layer as shown in FIG. 13 was examined by changing the penetration of the first resin layer 10a. A solid electrolytic capacitor according to Reference Example 1 was produced in the same manner as in Example 1, except that the second resin layer 10b was not formed and the first resin layer 10a was formed also in a region where the second resin layer 10b should be formed in Example 1. The exposed portion 40 of the solid electrolytic capacitor according to this reference example formed in the above manner was covered with the first resin layer 10a.

Solid electrolytic capacitors according to Reference Examples 1 to 10 were obtained by producing them in the above manner to allow their first resin layers 10a to have different penetrations of 15, 30, 40, 65, 90, 110, 150, 180, 200 and 220.

(Measurement of Leakage Current)

A voltage of 2.5 V was applied to the solid electrolytic capacitors according to Reference Examples 1 to 10, and their leakage currents were measured 20 seconds after the voltage application. TABLE 1 shows the results of leakage current measurement. Note that the values of leakage current are relative values when the value of leakage current in Reference Example 1 is taken as 100.

TABLE 1

| | Blending Ratio (Parts by Weight) | | | Leakage Current (Relative Value) |
|---|---|---|---|---|
| | A | B | Penetration | |
| Ref. Ex. 2 | 100 | 130 | 15 | 155.00 |
| Ref. Ex. 3 | 100 | 120 | 30 | 121.25 |
| Ref. Ex. 4 | 100 | 110 | 40 | 106.25 |
| Ref. Ex. 1 | 100 | 100 | 65 | 100.00 |
| Ref. Ex. 5 | 100 | 95 | 90 | 102.50 |
| Ref. Ex. 6 | 100 | 90 | 110 | 106.25 |
| Ref. Ex. 7 | 100 | 85 | 150 | 112.50 |
| Ref. Ex. 8 | 100 | 80 | 180 | 120.00 |
| Ref. Ex. 9 | 100 | 75 | 200 | 125.00 |
| Ref. Ex. 10 | 100 | 70 | 220 | 160.00 |

TABLE 1 shows that in resin layers of single layer structure, if the penetration of silicon resin used for the first resin layer 10a was within the range of 30 to 200, the resin layer could reduce the leakage current as compared to the other penetrations. Furthermore, it was founded that the penetration should more preferably be within the range of 40 to 150.

In view of these findings and based on the results of the best three of Reference Examples that could reduce the leakage current, i.e., Reference Examples 1, 4 and 5, solid electrolytic capacitors according to Examples 2 to 9 were also produced.

Examples 2 and 3

Solid electrolytic capacitors according to Examples 2 and 3 were produced by conducting Step 6 in Example 1 to bring the respective penetrations of their second resin layers to 30 and 40. The formation of silicon resins having different penetrations can be controlled by changing the blending ratio of solution of TSE3070(B) to solution of TSE3070(A). Specifically, 100 parts by weight of solution of TSE3070(A) was blended with each of 120 parts by weight of solution of TSE3070(B) and 110 parts by weight of solution of TSE3070

(B), thereby forming second resin layers in Examples 2 and 3, respectively. In producing the solid electrolytic capacitors according to Examples 2 and 3, the other steps were the same as in Example 1.

Reference Examples 11 to 14

Solid electrolytic capacitors according to Reference Examples 11 to 14 were produced in the same manner as in Example 1 except that in Step 6 in Example 1 silicon resins were used to bring the respective penetrations of their second resin layers to 65, 90, 180 and 220. Specifically, 100 parts by weight of solution of TSE3070(A) was blended with each of 100 parts by weight of solution of TSE3070(B), 95 parts by weight of solution of TSE3070(B), 80 parts by weight of solution of TSE3070(B) and 70 parts by weight of solution of TSE3070(B), thereby preparing solid electrolytic capacitors according to Reference Examples 11 to 14, respectively.

(Measurement of Leakage Current)

A voltage of 2.5 V was applied to the solid electrolytic capacitors according to Examples 1 to 3 and Reference Examples 11 to 14, and their leakage currents were measured 20 seconds after the voltage application. TABLE 2 shows the results of leakage current measurement. Note that the values of leakage current are relative values when the value of leakage current in Reference Example 1 is taken as 100.

TABLE 2

| | Penetration of First Resin Layer | Penetration of Second Resin Layer | Leakage Current (Relative Value) |
|---|---|---|---|
| Ex. 1 | 65 | 15 | 81.25 |
| Ex. 2 | 65 | 30 | 75.00 |
| Ex. 3 | 65 | 40 | 80.00 |
| Ref. Ex. 11 | 65 | 65 | 100.00 |
| Ref. Ex. 12 | 65 | 90 | 101.25 |
| Ref. Ex. 13 | 65 | 180 | 117.50 |
| Ref. Ex. 14 | 65 | 220 | 156.25 |

Examples 1 to 3 could reduce the leakage current as compared to Reference Examples 11 to 14. The reason for this can be explained as follows: In Examples 1 to 3, the exposed portion 40, the other end 2b of the anode lead and the connecting part α were covered with a resin layer 10 composed of first and second resin layers 10a and 10b and, additionally, the first resin layer 10a was softer than the second resin layer 10b. Therefore, in Examples 1 to 3, stress transmitted from the exposed portion 40 and the anode lead 2 to the dielectric layer 3 and stress transmitted from the anode terminal 7 through the anode lead 2 to the dielectric layer 3 in the molding process could be reduced. Thus, the occurrence of cracks in the dielectric layer 3 can be suppressed, and the leakage current could thereby be reduced.

On the other hand, in Reference Example 11 in which both the first and second resin layers 10a and 10b were formed but had equal penetrations and in Reference Examples 12 to 14 in which both the first and second resin layers 10a and 10b were formed but the second resin layer 10b had a greater penetration than the first resin layer 10a, the leakage current could not be reduced. The reason for this can be explained as follows: In Reference Examples 11 to 14, since the penetration of each second resin layer 10b is equal to or greater than that of the first resin layer 10a, each of the second resin layers 10b in Reference Examples 11 to 14 could not increase the effect of mechanically reinforcing the first resin layer 10a. Therefore, Reference Examples 11 to 14 could not increase the effect of the first resin layer 10a reducing the stress on the exposed portion 40 and, therefore, could not reduce the stress transmitted from the anode terminal 7 through the anode lead 2 to the dielectric layer 3, whereby their leakage currents were increased.

It can be assumed that, for the reasons described so far, Examples 1 to 3 could suppress the occurrence of cracks and the like in the dielectric layer 3 and reduce the leakage current, unlike Reference Examples 11 to 14.

Examples 4 and 5

Solid electrolytic capacitors according to Examples 4 and 5 were produced in the same manner as in Example 1, except that in Step 6 in Example 1 silicon resins were used to bring the penetration of their first resin layers to 40 and silicon resins were used to bring the respective penetrations of their second resin layers to 15 and 30.

Reference Examples 15 to 19

Solid electrolytic capacitors according to Reference Examples 15 to 19 were produced in the same manner as in Example 1, except that in Step 6 in Example 1 silicon resins were used to bring the penetration of their first resin layers to 40 and silicon resins were used to bring the respective penetrations of their second resin layers to 40, 65, 90, 180 and 220.

TABLE 3 shows the results of leakage current measurement. Note that the values of leakage current are relative values when the value of leakage current in Reference Example 1 is taken as 100.

TABLE 3

| | Penetration of First Resin Layer | Penetration of Second Resin Layer | Leakage Current (Relative Value) |
|---|---|---|---|
| Ex. 4 | 40 | 15 | 80.00 |
| Ex. 5 | 40 | 30 | 83.75 |
| Ref. Ex. 15 | 40 | 40 | 106.25 |
| Ref. Ex. 16 | 40 | 65 | 108.75 |
| Ref. Ex. 17 | 40 | 90 | 110.00 |
| Ref. Ex. 18 | 40 | 180 | 122.50 |
| Ref. Ex. 19 | 40 | 220 | 157.50 |

It can be assumed that Examples 4 and 5, unlike Reference Examples 15 to 19, could suppress the occurrence of cracks and the like in the dielectric layer 3 for the same reasons as in the previously stated results (Examples 1 to 3) and, therefore, could reduce the leakage current.

Examples 6 to 9

Solid electrolytic capacitors according to Examples 6 to 9 were produced in the same manner as in Example 1, except that in Step 6 in Example 1 silicon resins were used to bring the penetration of their first resin layers to 90 and silicon resins were used to bring the respective penetrations of their second resin layers to 15, 30, 40 and 65.

Reference Examples 20 to 22

Solid electrolytic capacitors according to Reference Examples 20 to 22 were produced in the same manner as in Example 1, except that in Step 6 in Example 1 silicon resins were used to bring the penetration of their first resin layers to 90 and silicon resins were used to bring the respective penetrations of their second resin layers to 90, 180 and 220.

TABLE 4 shows the results of leakage current measurement. Note that the values of leakage current are relative values when the value of leakage current in Reference Example 1 is taken as 100.

TABLE 4

|  | Penetration of First Resin Layer | Penetration of Second Resin Layer | Leakage Current (Relative Value) |
| --- | --- | --- | --- |
| Ex. 6 | 90 | 15 | 83.75 |
| Ex. 7 | 90 | 30 | 80.00 |
| Ex. 8 | 90 | 40 | 77.50 |
| Ex. 9 | 90 | 65 | 81.25 |
| Ref. Ex. 20 | 90 | 90 | 102.50 |
| Ref. Ex. 21 | 90 | 180 | 117.50 |
| Ref. Ex. 22 | 90 | 220 | 155.00 |

It can be assumed that Examples 6 to 9, unlike Reference Examples 20 to 22, could suppress the occurrence of cracks and the like in the dielectric layer 3 for the same reasons as in the previously stated results (Examples 1 to 3) and, therefore, could reduce the leakage current.

Examples 1 to 9 could reduce the leakage current as compared to Reference Examples 11 to 22. In Examples 1 to 9, by making the penetration of the first resin layer 10a greater than that of the second resin layer 10b, the first resin layer 10a is made relatively softer than the second resin layer 10b. Therefore, stress due to a pouring pressure in the molding process can be reduced by the soft first resin layer 10a. This can reduce the stress transmitted from the exposed portion 40 and the anode lead 2 to the dielectric layer and the stress transmitted from the anode terminal 7 through the anode lead 2 to the dielectric layer. Furthermore, since, in sequentially forming the first and second resin layers 10a and 10b, the first resin layer 10a is covered with the second resin layer 10b harder than the first resin layer 10a, the first resin layer 10a covering the exposed portion 40 can be stably held by the second resin layer 10b. Thus, the transmission of stress on the exposed portion 40 to the dielectric layer can be effectively suppressed. For these reasons, Examples 1 to 9 can reduce the leakage current as compared to Reference Examples 11 to 22.

The results of Reference Examples 1 to 10 also shows that the penetration of resin to be used for the first resin layer 10a is preferably within the range of 30 to 200. More preferred penetration of resin to be used for the first resin layer 10a is within the range of 40 to 150. The reason for this is as follows: If the penetration of the first resin layer 10a is too small, the function of reducing the stress on the exposed portion 40 is decreased. On the other hand, if the penetration of the first resin layer 10a is too great, the resin becomes too soft, which makes the resin difficult to handle, makes it difficult for the second resin layer 10b to hold the first resin layer 10a and in turn decreases the function of reducing the stress.

Reference Example 23

Figure 14:
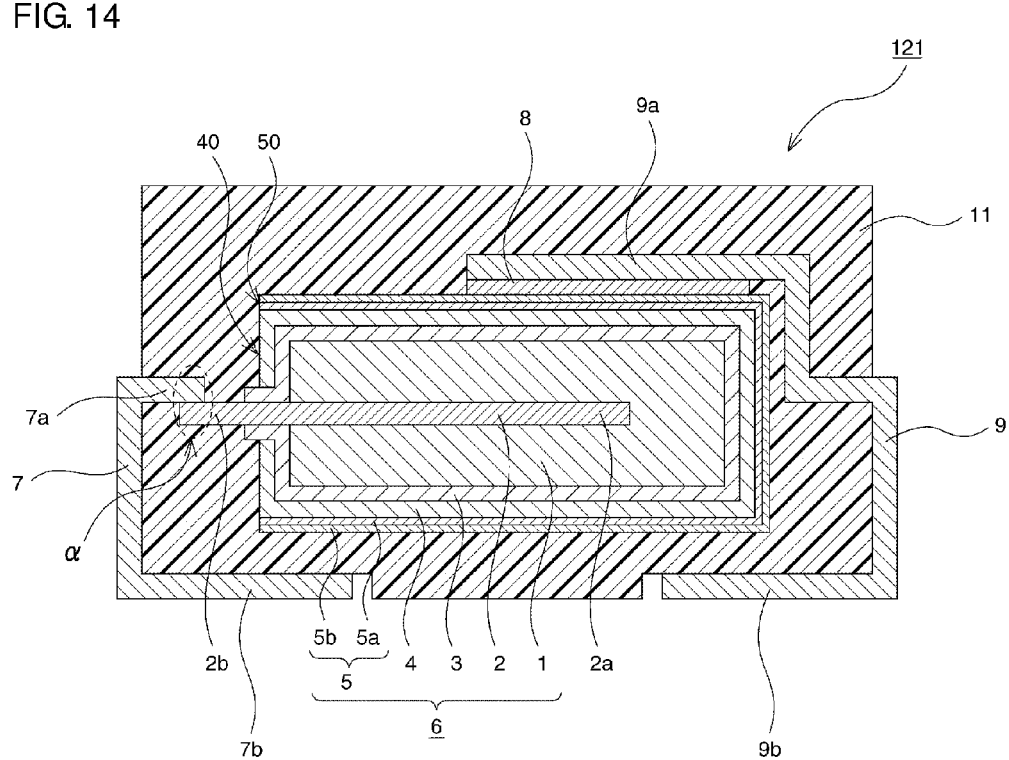
FIG. 14 is a cross-sectional view for illustrating a solid electrolytic capacitor according to Reference Example 23.

FIG. 14 is a cross-sectional view of a solid electrolytic capacitor 121 according to Reference Example 23.

In this reference example, a solid electrolytic capacitor 121 according to Reference Example 23 was produced in the same manner as in Example 1 except that Step 6 in Example 1 was not conducted, i.e., the resin layer 10 in Example 1 was not formed.

TABLE 5 shows the result of leakage current measurement. Note that the value of leakage current is a relative value when the value of leakage current in Reference Example 1 is taken as 100.

TABLE 5

|  | Leakage Current (Relative Value) |
| --- | --- |
| Ref. Ex. 23 | 1537.50 |

Reference Example 23, in which any resin layer 10 composed of first and second resin layers 10a and 10b was not formed, significantly increased the leakage current as compared to Examples 1 to 9. It can be assumed that, in Reference Example 23, since first and second resin layers 10a and 10b were not formed, stress transmitted from the anode terminal 7 through the anode lead 2 to the dielectric layer in the molding process could not be reduced, whereby the leakage current was increased. In addition, it can be assumed that, in Reference Example 23, since any resin layer 10 for protecting the exposed portion was not formed, the leakage current was increased.

Example 10

A solid electrolytic capacitor 30 of Example 10 according to the fourth embodiment was produced. In producing the solid electrolytic capacitor 30 according to Example 10, the rest of the process except for the steps described below was the same as in Example 1.

In Steps 1 to 4, two capacitor elements 6A and 6B were formed in the same manner as in Example 1.

Figure 8:
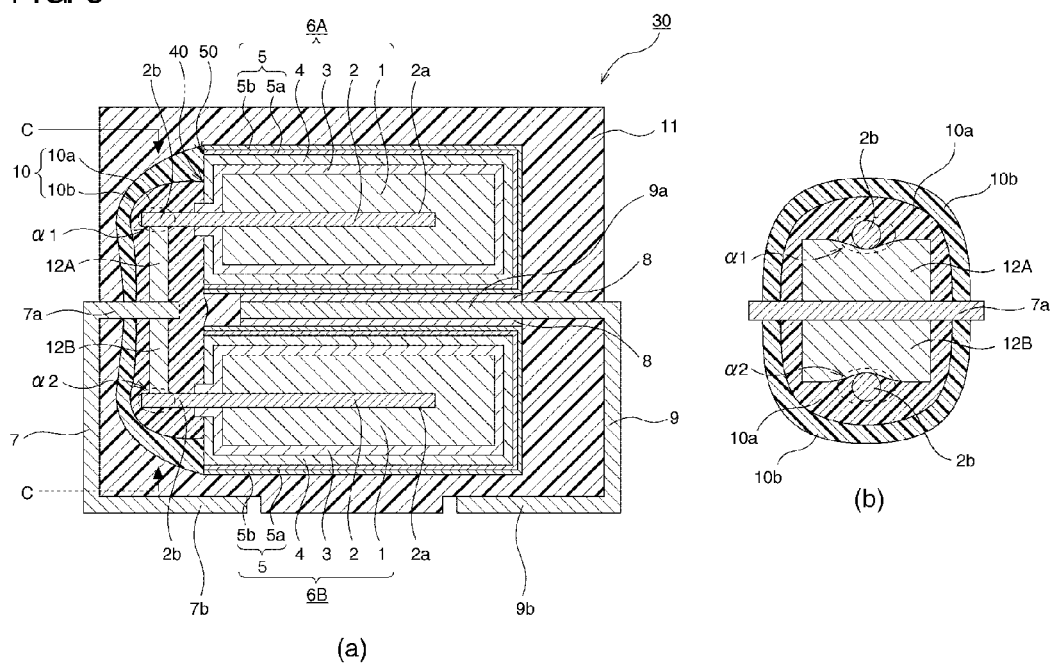
FIG. 8 shows cross-sectional views for illustrating a solid electrolytic capacitor according to a fourth embodiment.

In Step 5, the capacitor elements 6A and 6B were connected to the anode terminal 7 and the cathode terminal 9. As shown in FIG. 8, the connection between the top side of one end 7a of the anode terminal 7 and the other end 2b of the anode lead 2 of the first capacitor element 6A was made at the connecting part α1 through a first connecting member 12A. The connection between the underside of the one end 7a of the anode terminal 7 and the other end 2b of the anode lead 2 of the second capacitor element 6B was made at the connecting part α2 through a second connecting member 12B. The top side of one end 9a of the cathode terminal 9 was connected to the underside of the first capacitor element 6A by a conductive adhesive 8. The underside of the one end 9a of the cathode terminal 9 was connected to the top side of the second capacitor element 68 by a conductive adhesive 8.

In Step 6, as shown in FIG. 8, a first resin layer 10a was formed to cover part of the exposed portion 40, the connecting part α1 and the connecting member 12A of the capacitor element 6A, part of the exposed portion 40, the connecting part α2 and the connecting member 12B of the capacitor element 6B, and a part at which one end 7a of the anode terminal 7 was connected to the connecting members 12A and 12B. Then, a second resin layer 10b was formed to cover the first resin layer 10a.

Example 11

A solid electrolytic capacitor 31 of Example 11 according to Modification 1 of the fourth embodiment was produced (see FIG. 9). In producing the solid electrolytic capacitor 31 according to Example 11, the rest of the process except for the step described below was the same as in Example 10.

In Step 6, a first resin layer 10a was formed, a second resin layer 10b was then formed to cover the first resin layer 10a, and a third resin layer 13 was formed to cover the surfaces 51 of the capacitor elements 6A and 6B at which the cathode layers 5 were exposed with the anode and cathode terminals 7 and 9 connected to the capacitor elements 6A and 6B. Silicon resin was used for the third resin layer 13. Specifically, the silicon resin used was Part No. TSE3253 manufactured by Momentive Performance Materials Japan LLC. The penetration of the third resin layer 13 thus formed was 15.

Example 12

A solid electrolytic capacitor 32 according to Example 12 was produced in the same manner as in Example 11 except that a fourth resin layer 14 was formed around each of the roots 2c of the anode leads 2, which are parts at which the anode lead 2 extend from the surfaces 50 of the capacitor elements 6A and 6B subjected to Steps 1 to 4 (see FIG. 11). Epoxy resin was used for the third resin layer 10d. Specifically, the epoxy resin used was Part No. ME-5909 manufactured by Nippon Pelnox Corporation. The penetration of the third resin layer 10d thus formed was below 10.

Reference Example 24

Figure 15:
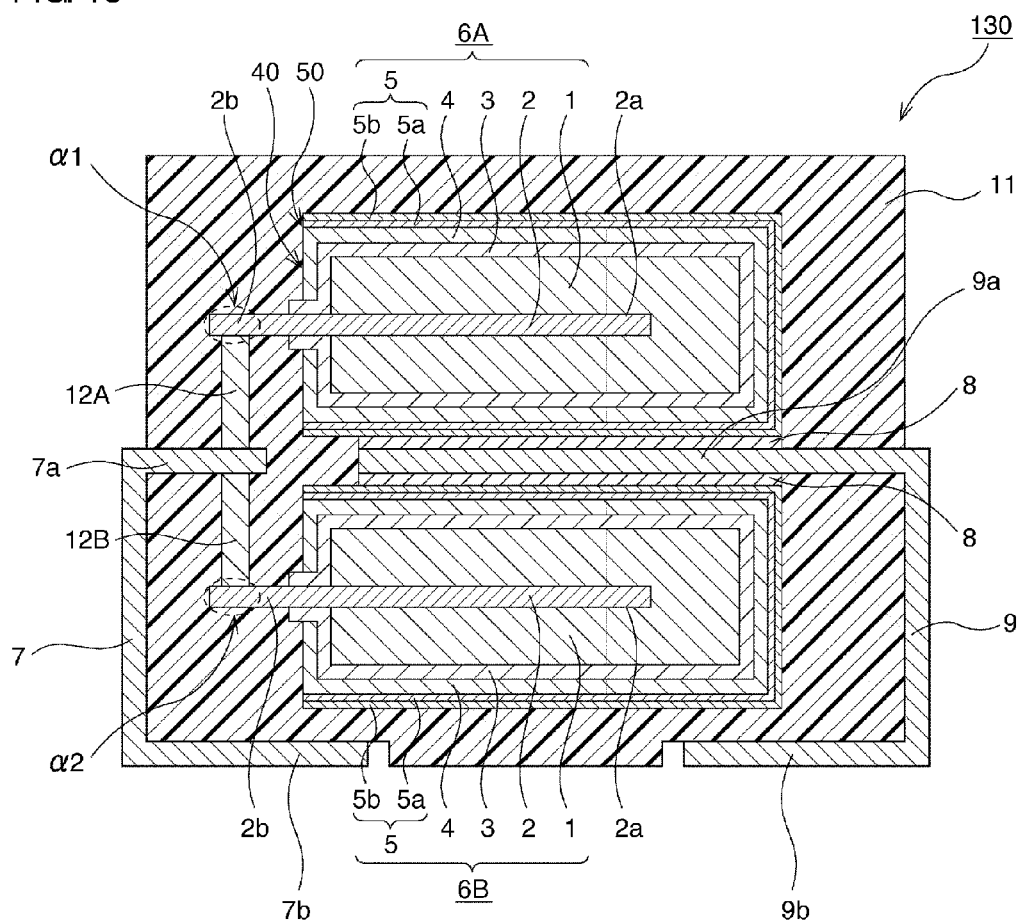
FIG. 15 is a cross-sectional view for illustrating a solid electrolytic capacitor according to Reference Example 24.

FIG. 15 is a cross-sectional view of a solid electrolytic capacitor 130 according to Reference Example 24. In this reference example, a solid electrolytic capacitor 130 according to Reference Example 24 was produced in the same manner as in Example 10 except that Step 6 in Example 10 was not conducted, i.e., the resin layer 10 in Example 10 was not formed.

Reference Example 25

Figure 16:
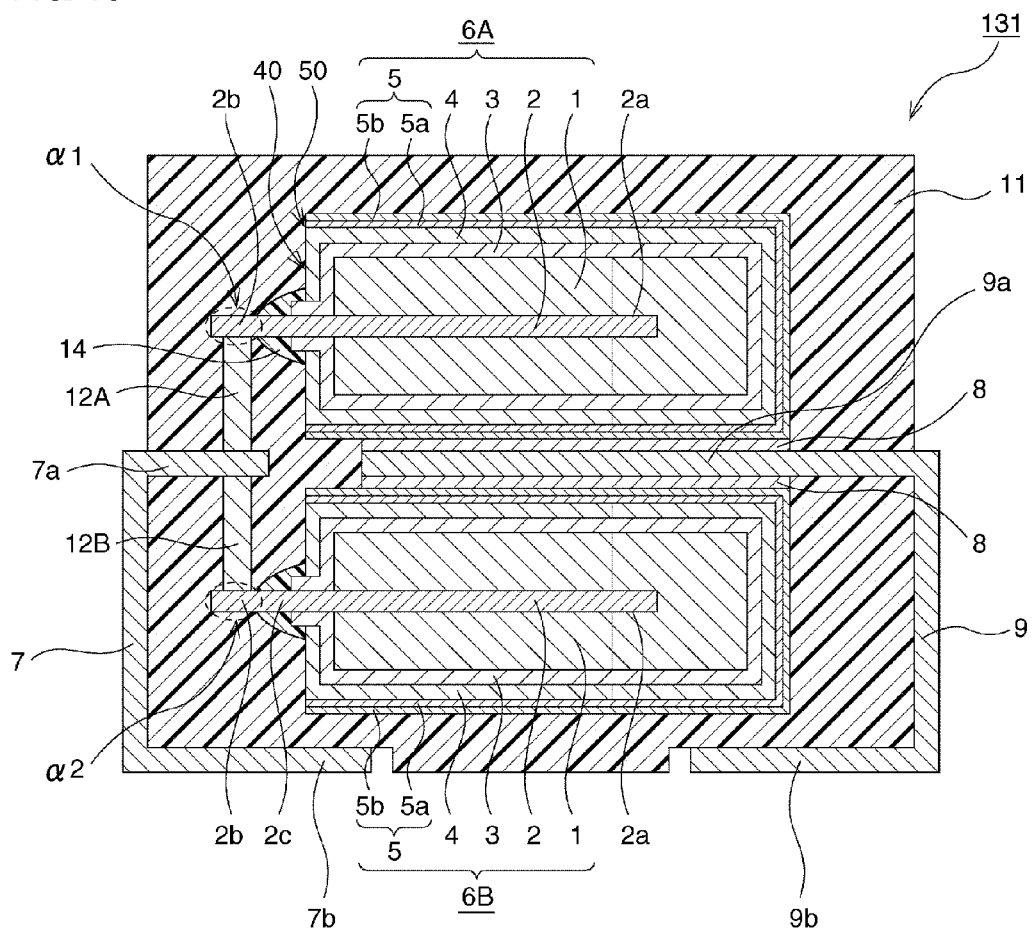
FIG. 16 is a cross-sectional view for illustrating a solid electrolytic capacitor according to Reference Example 25.
Figure 17:
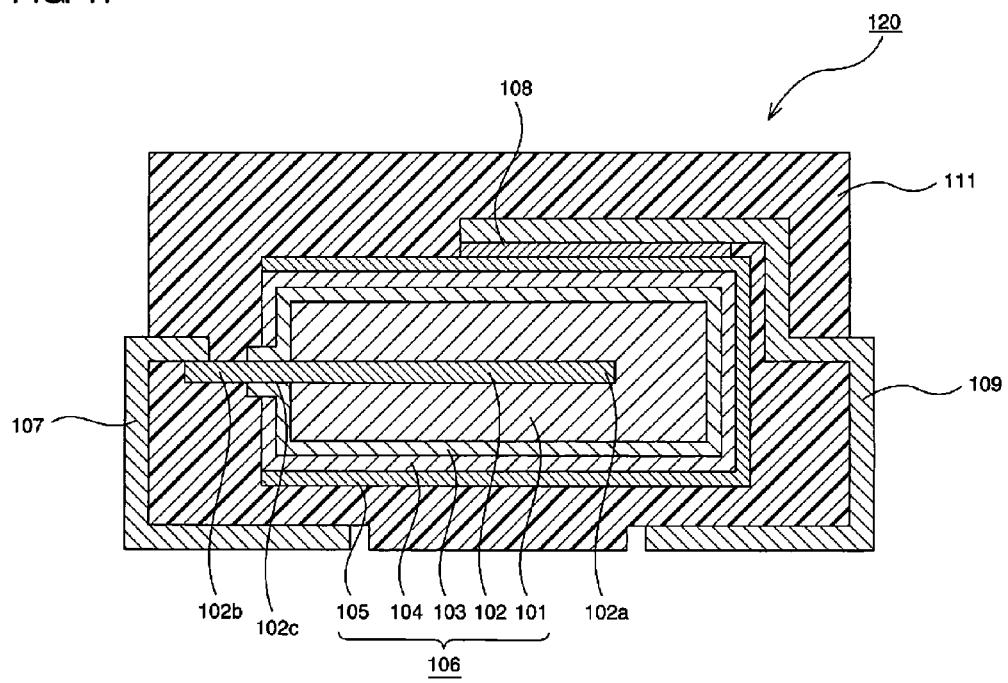
FIG. 17 is a cross-sectional view for illustrating a conventional solid electrolytic capacitor.

FIG. 16 is a cross-sectional view of a solid electrolytic capacitor 131 according to Reference Example 25. In this reference example, a solid electrolytic capacitor 131 according to Reference Example 25 was produced in the same manner as in Example 12 except that Step 6 in Example 12 was not conducted, i.e., the resin layer 10 and the third resin layer 13 in Example 12 were not formed.

TABLE 6 shows the results of leakage current measurement. Note that the values of leakage current are relative values when the value of leakage current in Example 10 is taken as 100.

TABLE 6

|  | Penetration of First Resin Layer | Penetration of Second Resin Layer | Leakage Current (Relative Value) |
| --- | --- | --- | --- |
| Ex. 10 | 60 | 15 | 100 |
| Ex. 11 | 60 | 15 | 93 |
| Ex. 12 | 60 | 15 | 90 |
| Ref. Ex. 24 | — | — | 3129 |
| Ref. Ex. 25 | — | — | 1952 |

Examples 10 to 12 could reduce the leakage current as compared to Reference Examples 24 and 25 in which the resin layer 10 was not formed. It was proved from the results of Examples 11 and 12 that the leakage current can be further reduced by forming the first resin layer 13 or the fourth resin layer 14.

What is claimed is:

1. A solid electrolytic capacitor including at least one capacitor element that includes an anode, a dielectric layer covering the anode, an electrolyte layer covering the dielectric layer, a cathode layer partly covering the electrolyte layer and an anode lead one end of which is joined to the anode and the other end of which extends beyond an exposed portion of the electrolyte layer exposed from the cathode layer, wherein
the solid electrolytic capacitor further includes: an anode terminal connected to the other end of the anode lead by welding, a cathode terminal connected to the cathode layer, a resin layer covering the exposed portion of the electrolyte layer, the other end of the anode lead, and a connecting part between the other end of the anode lead and the anode terminal, but not covering an entire surface of the capacitor element; and
a resin outer package covering the capacitor element and the resin layer; wherein
the resin layer includes a first resin layer covering an entire surface of the exposed portion and a second resin layer covering on an entire surface of the first resin layer, the first resin layer being softer than the second resin layer.

2. The solid electrolytic capacitor according to claim 1, wherein the other end of the anode lead and the anode terminal are connected to each other through a connecting member, and a connecting part between the other end of the anode lead and the connecting member is covered with the resin layer.

3. The solid electrolytic capacitor according to claim 2, wherein the resin layer covers a connecting part between the connecting member and the anode terminal.

4. The solid electrolytic capacitor according to claim 1, wherein the penetration of the first resin layer is within the range of 30 to 200.

5. The solid electrolytic capacitor according to claim 1, wherein a third resin layer is formed to cover the cathode layer.

6. A solid electrolytic capacitor including at least one capacitor element that includes an anode, a dielectric layer covering the anode, an electrolyte layer covering the dielectric layer, a cathode layer partly covering the electrolyte layer and an anode lead one end of which is joined to the anode and the other end of which extends beyond an exposed portion of the electrolyte layer exposed from the cathode layer, wherein
the solid electrolytic capacitor further includes: an anode terminal connected to the other end of the anode lead in a resin layer, a cathode terminal connected to the cathode layer, the resin layer covering the exposed portion of the electrolyte layer, the other end of the anode lead, and a connecting part between the other end of the anode lead and the anode terminal, but not covering an entire surface of the capacitor element; and
a resin outer package covering the capacitor element and the resin layer; wherein
the resin layer includes a first resin layer covering an entire surface of the exposed portion and a second resin layer covering on an entire surface of the first resin layer, the first resin layer being softer than the second resin layer.

7. The solid electrolytic capacitor according to claim 6, wherein the anode terminal connected to the other end of the anode lead in the first resin layer.

* * * * *